(12) United States Patent
Sasaki et al.

(10) Patent No.: US 12,110,051 B2
(45) Date of Patent: Oct. 8, 2024

(54) INPUT DEVICE, MOVABLE BODY, AND STEERING SHAFT SYSTEM

(71) Applicant: Panasonic Intellectual Property Management Co., Ltd., Osaka (JP)

(72) Inventors: Shinichiro Sasaki, Aichi (JP); Toshio Osawa, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 101 days.

(21) Appl. No.: 17/845,687

(22) Filed: Jun. 21, 2022

(65) Prior Publication Data

US 2022/0315092 A1    Oct. 6, 2022

Related U.S. Application Data

(63) Continuation of application No. PCT/JP2020/043390, filed on Nov. 20, 2020.

(30) Foreign Application Priority Data

Dec. 23, 2019  (JP) .................................. 2019-231882
Mar. 30, 2020  (JP) .................................. 2020-061550

(51) Int. Cl.
  *B62D 1/16*    (2006.01)
  *H01H 21/22*   (2006.01)

(52) U.S. Cl.
  CPC .............. *B62D 1/16* (2013.01); *H01H 21/22* (2013.01)

(58) Field of Classification Search
  CPC ................................... B62D 1/10; B62D 1/16
  (Continued)

(56) References Cited

U.S. PATENT DOCUMENTS

2009/0090826 A1   4/2009   Takahashi
2010/0061797 A1   3/2010   Wright
(Continued)

FOREIGN PATENT DOCUMENTS

JP    2009-090754 A    4/2009
JP    2016-157612 A    9/2016

OTHER PUBLICATIONS

International Search Report, mailed Jan. 26, 2021, for International Application No. PCT/JP2020/043390 (5 pages including translation).

(Continued)

*Primary Examiner* — Randell J Krug
(74) *Attorney, Agent, or Firm* — Seed IP Law Group LLP

(57) ABSTRACT

An input device includes: a casing that includes a tubular portion in which an end portion of a column post is fitted, and to which a turn lever unit that a driver operates is attached, the column post rotatably supporting a steering shaft; and a biasing member disposed between a brim portion and the column post in a central axis direction of the tubular portion, the brim portion being provided on an inside surface of the tubular portion. The tubular portion includes an engaging portion that engages, in the central axis direction, with an engaged portion of the column post, and in a state in which the engaging portion is engaging with the engaged portion, the biasing member biases the brim portion in a direction in which the brim portion moves away from the column post, the direction being in the central axis direction.

13 Claims, 32 Drawing Sheets

(58) Field of Classification Search
USPC ................................. 74/473.31, 484 R, 492
See application file for complete search history.

(56) References Cited

U.S. PATENT DOCUMENTS

2016/0247647 A1   8/2016   Usuya et al.
2017/0080968 A1*  3/2017   Frenzel .................. B62D 1/16

OTHER PUBLICATIONS

Japanese Notice of Reasons for Refusal, dated Oct. 3, 2023, for Japanese Patent Application No. 2020-061550. (10 pages) (with English translation).

* cited by examiner

INPUT DEVICE, MOVABLE BODY, AND STEERING SHAFT SYSTEM

CROSS REFERENCE TO RELATED APPLICATIONS

This is a continuation application of PCT International Application No. PCT/JP2020/043390 filed on Nov. 20, 2020, designating the United States of America, which is based on and claims priority of Japanese Patent Application No. 2019-231882 filed on Dec. 23, 2019 and Japanese Patent Application No. 2020-061550 filed on Mar. 30, 2020.

FIELD

The present disclosure relates to an input device, a movable body, and a steering shaft system.

BACKGROUND

Conventionally, a switch device that is an input device attached to a steering shaft of a vehicle has been disclosed (for example, see Patent Literature (PTL) 1).

This switch device includes a tubular fitted portion in which a column post that rotatably supports a steering shaft is fitted. An elastic clamping band member that is ring-shaped is attached to the fitted portion, surrounding the fitted portion. A pin is attached to the clamping band member so that the clamping band member is prevented from clamping the fitted portion. The column post is fitted in the fitted portion in a state in which such a pin is attached to the clamping band member. When the pin is removed from the clamping band member, the clamping band member clamps the fitted portion. Accordingly, the fitted portion and the column post are fixed to each other. Stated differently, the switch device is attached to the steering shaft.

CITATION LIST

Patent Literature

PTL 1: Japanese Unexamined Patent Application Publication No. 2016-157612

SUMMARY

However, the switch device according to PTL 1 is susceptible of a further improvement.

In view of this, the present disclosure provides, for instance, an input device that can exhibit a further improvement over the above related art.

An input device according to an aspect of the present disclosure includes: a casing that includes a tubular portion in which an end portion of a column post is fitted, and to which an operation portion that a driver operates is attached, the column post rotatably supporting a steering shaft; and a biasing member disposed between a brim portion and the column post in a central axis direction of the tubular portion, the brim portion being provided on an inside surface of the tubular portion. The tubular portion includes an engaging portion that engages, in the central axis direction, with an engaged portion of the column post, and in a state in which the engaging portion is engaging with the engaged portion, the biasing member biases the brim portion in a direction in which the brim portion moves away from the column post, the direction being in the central axis direction.

The input device according to the present disclosure can exhibit a further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
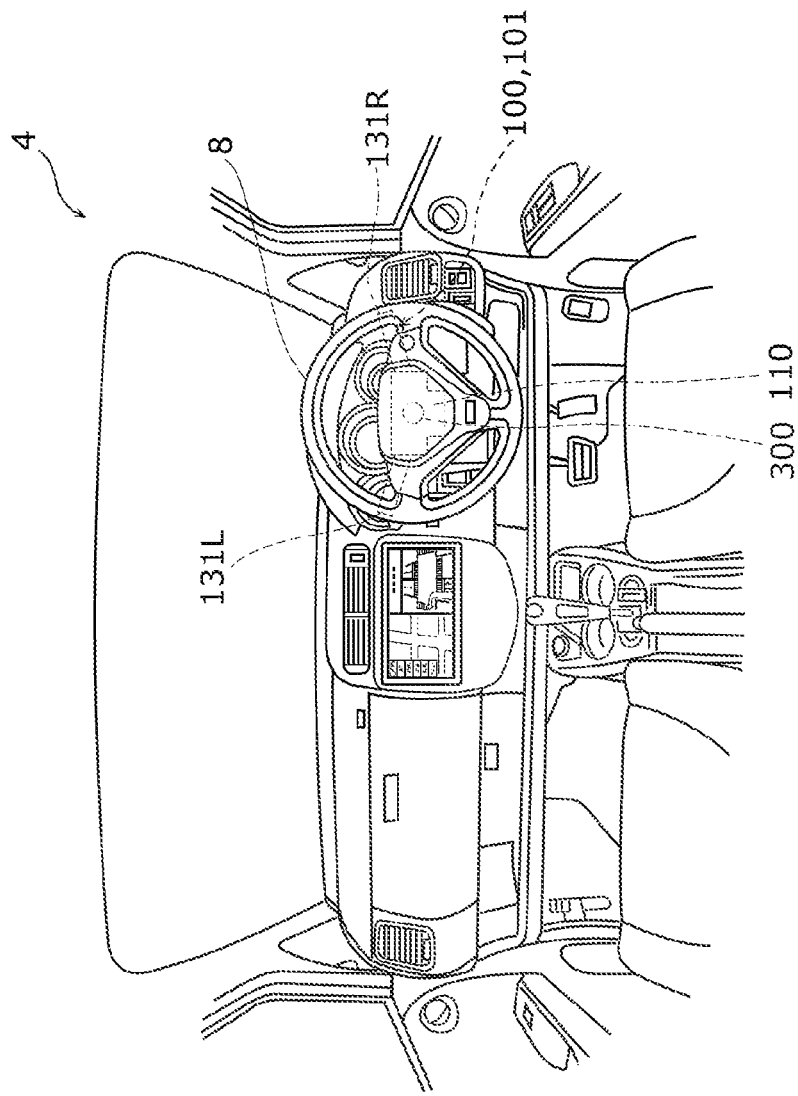
FIG. 1 illustrates an example of a vehicle in which an input device is provided in Embodiments 1 and 2.

An input device according to an aspect of the present disclosure includes: a casing that includes a tubular portion in which an end portion of a column post is fitted, and to which an operation portion that a driver operates is attached; the column post rotatably supporting a steering shaft; and a biasing member disposed between a brim portion and the column post in a central axis direction of the tubular portion, the brim portion being provided on an inside surface of the tubular portion. The tubular portion includes an engaging portion that engages, in the central axis direction, with an engaged portion of the column post, and in a state in which the engaging portion is engaging with the engaged portion, the biasing member biases the brim portion in a direction in which the brim portion moves away from the column post, the direction being in the central axis direction.

Accordingly, a further improvement can be achieved. Thus, the switch device according to PTL 1 requires a space around the fitted portion for attaching the clamping member to the fitted portion, and as a result, it is difficult to reduce the size of the switch device, which is a problem. However, the size of the input device according to an aspect of the present disclosure can be readily reduced. Specifically, the following gives a detailed description.

In the input device according to an aspect of the present disclosure, in a state in which the engaging portion of the tubular portion is engaging with the engaged portion of the column post, the biasing member biases (the term "bias" herein means to "exert a force (to)") the brim portion of the tubular portion in a direction in which the brim portion moves away from the column post. Thus, the engaging portion and the engaged portion are firmly engaged with each other in the central axis direction by the biasing force applied from the biasing member, and the friction between the tubular portion and the column post can be increased. As a result, a shift of the tubular portion in the central axis direction thereof relative to the column post can be reduced, and also rotation of the tubular portion in the circumferential direction relative to the column post can be reduced. Accordingly, the input device can be fixed to the column post. Furthermore, it is unnecessary to use the clamping band member as in PTL 1 above to fix the input device to the column post, and thus a space for attaching the clamping band member is not required. As a result, the size of the input device can be readily reduced. Furthermore, in PTL 1 above, when the input device is detached from the steering shaft, a dedicated tool to loosen the clamping by the clamping band member is necessary. However, the input device according to an aspect of the present disclosure does not need such a clamping band member, and thus can be readily detached without using such a dedicated tool. Furthermore, in PTL 1 above, the pin removed from the clamping band member is discarded, but nevertheless, the input device according to an aspect of the present disclosure does not use such a pin, and thus resources can be prevented from being wastefully discarded.

The input device may further include: a rotation restriction member that is disposed between the brim portion and the column post in the central axis direction of the tubular portion, and restricts rotation of the tubular portion in a circumferential direction relative to the column post. The rotation restriction member may restrict rotation of the tubular portion by engaging with the brim portion in the circumferential direction and engaging with the column post in the circumferential direction, in a state in which the biasing member is located between the rotation restriction member and the brim portion.

Accordingly, rotation of the tubular portion in the circumferential direction relative to the column post can be restricted, and thus the input device can be firmly fixed to the column post.

The rotation restriction member may include: a base; and a projection in contact with the column post, the projection projecting from the base, and the rotation restriction member may press and elastically deform the biasing member by the projection being in contact with the column post. For example, the column post may include a first recess in which the projection is put, the first recess being recessed in a central axis direction of the column post. The first recess may have a bottom surface, the bottom surface including a non-sloping bottom surface and a sloping bottom surface. The non-sloping bottom surface may be substantially perpendicular to a central axis of the column post. The sloping bottom surface may have a slope that increases a depth of the first recess with distance from the non-sloping bottom surface. When the input device is attached to the steering shaft, the rotation restriction member may press and elastically deform the biasing member by the projection of the rotation restriction member, which is put in the first recess and faces the sloping bottom surface, sliding along the sloping bottom surface and moving onto the non-sloping bottom surface along with rotation of the casing.

Accordingly, if the casing is rotated in a state in which an end portion of the column post is pushed in the tubular portion of the casing and the engaging portion of the tubular portion is engaging with the engaged portion of the column post, the biasing member can be elastically deformed with ease. As a result, the input device can be fixed to the column post readily and further firmly.

The base of the rotation restriction member may include a rotation engaging portion that bends in the central axis direction of the tubular portion, the rotation engaging portion projecting toward the column post. The column post may further include a second recess that is recessed in the central axis direction of the column post, and in which the rotation engaging portion is put. When the input device is attached to the steering shaft, the rotation engaging portion of the rotation restriction member that is put in the second recess may be put into the first recess by moving while bending along with rotation of the casing, and the projection put into the first recess may engage with one of two lateral surfaces of the first recess, and the rotation engaging portion put into the first recess may engage with a remaining one of the two lateral surfaces of the first recess.

Accordingly, if the casing is rotated in a state in which an end portion of the column post is pushed in the tubular portion of the casing and the engaging portion of the tubular portion is engaging with the engaged portion of the column post, the projection and the rotation engaging portion can be readily put into the first recess. As a result, one of the projection and the rotation engaging portion engages with a lateral surface of the first recess and the other engages with another lateral surface thereof, so that the projection and the rotation engaging portion engage with the lateral surfaces in both ways of the circumferential direction of the tubular portion. Thus, rotation of the tubular portion in the circumferential direction relative to the column post can be appropriately restricted. Accordingly, the input device can be further firmly and readily fixed to the column post.

The biasing member may be a ring-shaped plate member, and curve in the central axis direction of the tubular portion.

Accordingly, the brim portion of the tubular portion can be greatly biased while the thickness of the biasing member in the central axis direction of the tubular portion is reduced. As a result, the input device can be further firmly fixed to the column post.

The rotation restriction member may be a ring-shaped member having one or more insertion holes, and a protrusion provided on the brim portion of the tubular portion may be put into each of the one or more insertion holes.

Accordingly, the protrusion of the tubular portion engages with the perimeter of the insertion hole of the rotation restriction member, in the circumferential direction of the tubular portion. Thus, the tubular portion can be appropriately restricted from rotating relative to the rotation restriction member.

A movable body according to an aspect of the present disclosure may include the input device, the steering shaft, and the column post. For example, the movable body is a vehicle.

Accordingly, the movable body can include an input device having a reduced size, and as a result, can be provided with a further greater indoor space.

A steering shaft system according to an aspect of the present disclosure may include: a steering shaft; and a column post that rotatably supports the steering shaft. The column post may include a first recess that is recessed in a central axis direction of the column post, and in which a projection included in a member for attaching an input device to the steering shaft is put. The first recess may have a bottom surface, the bottom surface including a non-sloping bottom surface and a sloping bottom surface. The non-sloping bottom surface may be substantially perpendicular to a central axis of the column post. The sloping bottom surface may have a slope that increases a depth of the first recess with distance from the non-sloping bottom surface. The column post may further include a second recess that is recessed in the central axis direction of the column post, and in which a rotation engaging portion included in the member for attaching the input device to the steering shaft is put.

Accordingly, the input device having a reduced size can be attached to the steering shaft. Furthermore, the input device can be firmly fixed to the column post.

The input device may further include: a rotation pressing member instead of the rotation restriction member disposed between the brim portion and the column post in the central axis direction of the tubular portion. The rotation pressing member may press and elastically deform the biasing member by rotating in a state in which the biasing member is located between the rotation pressing member and the brim portion.

Accordingly, friction between the tubular portion and the column post can be increased by rotating the rotation pressing member, and thus the input device can be fixed to the column post with easy work.

The rotation pressing member may include: a base; and at least one pressing portion that projects from the base and comes into contact with the biasing member, and the rotation pressing member may press and elastically deform the biasing member by the at least one pressing portion coming into contact with the biasing member along with rotation of the rotation pressing member.

Accordingly, the rotation pressing member can be readily formed by forming the pressing portion of the rotation pressing member into a mountain shape that includes a sloping portion that projects toward the biasing member.

When the input device is attached to the steering shaft, the at least one pressing portion may come into contact with, press, and elastically deform the biasing member by the rotation pressing member rotating.

Accordingly, friction between the tubular portion and the column post can be increased by rotating the rotation pressing member, and thus the input device can be fixed to the column post with easy work.

The brim portion of the tubular portion may include a restricted portion that projects or is recessed in the central axis direction, the column post may include a restricting portion that is recessed or projects in a central axis direction of the column post, and rotation of the tubular portion in a circumferential direction relative to the column post may be restricted in a state in which the restricted portion is engaged with the restricting portion.

Accordingly, rotation of the tubular portion in the circumferential direction relative to the column post can be restricted, and thus the input device can be further firmly fixed to the column post.

The biasing member may be a ring-shaped plate member, and curve in the central axis direction of the tubular portion.

Accordingly, the brim portion of the tubular portion can be greatly biased while the thickness of the biasing member in the central axis direction of the tubular portion is reduced. As a result, the input device can be further firmly fixed to the column post.

The rotation pressing member may include a rotation operation portion that extends outwardly from an outer circumference.

Accordingly, the rotation pressing member can be rotated by operating the rotation operation portion, and thus the input device can be readily fixed to the column post.

The following describes embodiments in detail, with reference to the drawings.

Note that the embodiments described below each show a general or specific example. The numerical values, shapes, materials, elements, the arrangement and connection of the elements, steps, the order of the steps, and others indicated in the following embodiments are mere examples, and therefore are not intended to limit the present disclosure. Among the elements in the following embodiments, those not recited in any of the independent claims defining the most generic concept are described as optional components.

The drawings are schematic diagrams, and do not necessarily provide strictly accurate illustration. The same numeral is given to the same member throughout the drawings. In the following embodiments, expressions such as "substantially perpendicular" are used. For example, the expression "substantially perpendicular" means not only completely perpendicular, but also considerably perpendicular. Thus, the meaning also includes a margin of error of about several percent. The expression "substantially perpendicular" means "perpendicular" in a range in which advantageous effects of the present disclosure can be yielded. The same applies to other expressions that include "substantially".

Embodiment 1

FIG. 1 illustrates an example of a vehicle in which an input device is provided in the present embodiment.

Input device 100 according to the present embodiment is disposed at steering shaft 300 that is provided at the driver seat of vehicle 4 with a right-hand steering wheel, for example, as illustrated in FIG. 1. Then, input device 100 receives, from a driver, steering of steering wheel 8 of vehicle 4 and operations of turn lever 131R and wiper lever 131L. Vehicle 4 is an automobile such as a passenger car, a bus, or a truck, for example. Note that vehicle 4 is not limited to an automobile, and may be a construction machine or an agricultural machine, for example.

Figure 2:
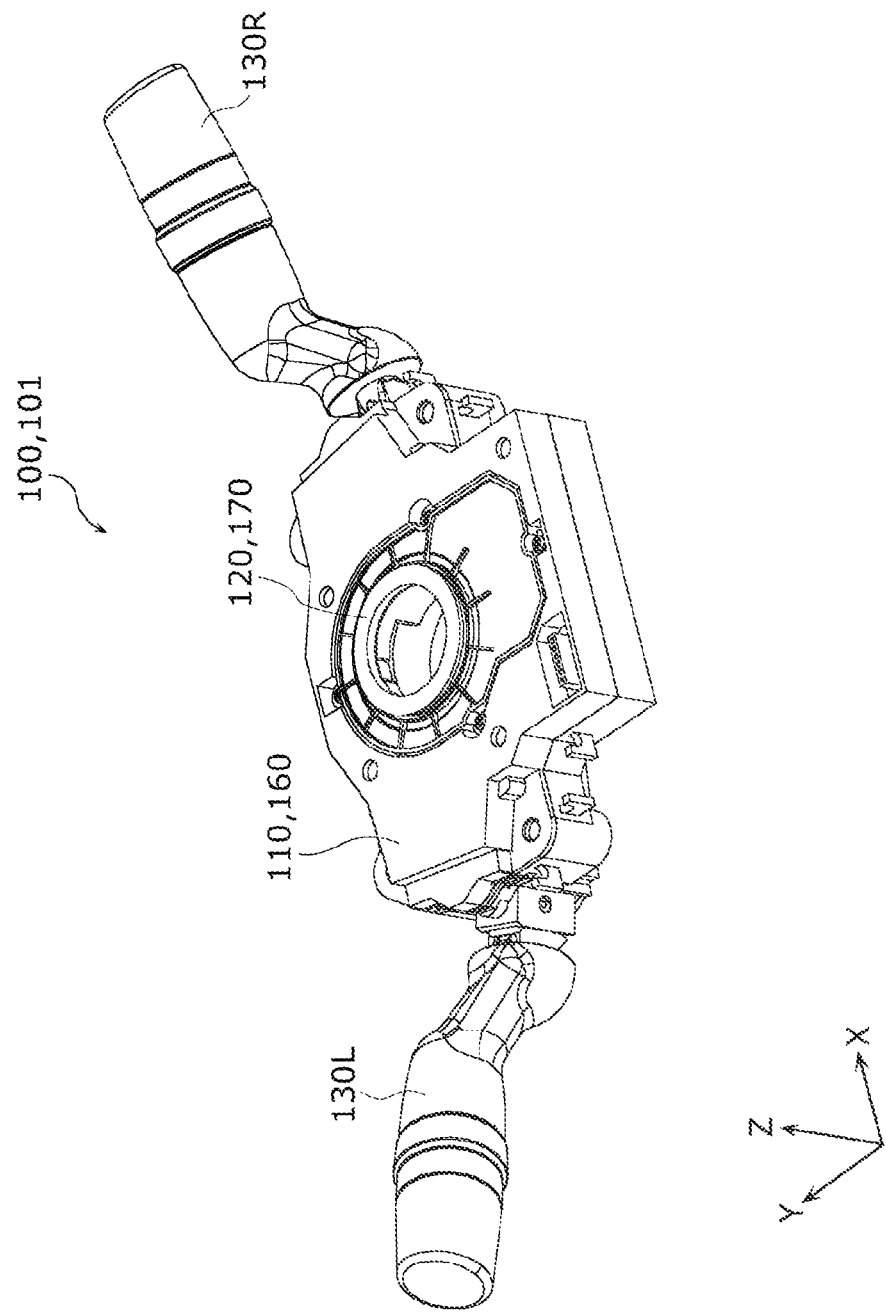
FIG. 2 is a perspective view of an appearance of the input device in Embodiments 1 and 2.

FIG. 2 is a perspective view of an appearance of input device 100 in the present embodiment. Note that in the present embodiment, the thickness direction of input device 100 is referred to as a Z-axis direction, and two directions perpendicular to the Z-axis direction are referred to as an X-axis direction and a Y-axis direction. The X-axis direction is a width direction (that is, a lateral direction) of input device 100, and the Y-axis direction is a depth direction of input device 100 and perpendicular to the X-axis direction. The positive side of the Z-axis direction is also referred to as an upper side, upward, or up, and the negative side of the Z-axis direction is also referred to as a lower side, downward, or down. The positive side of the X-axis direction is also referred to as a right side, rightward, or right, and the negative side of the X-axis direction is also referred to as a left side, leftward, or left. The positive side of the Y-axis direction is also referred to as a back side, backward, or back, and the negative side of the Y-axis direction is also referred to as a front side, frontward, or front.

Input device 100 includes casing 110, turn lever unit 130R, and wiper lever unit 130L, as illustrated in FIG. 2.

Casing 110 is, for example, a resin-molded product that includes tubular portion 120. The central axis of tubular portion 120 extends in the Z-axis direction, and steering shaft 300 is put into tubular portion 120.

Turn lever unit 130R is attached to casing 110 on the positive side of the X-axis direction, and is operated by the driver of vehicle 4 with his/her right hand, for example. Turn lever unit 130R is a combination switch that includes, for example, (a) a turn signal lamp switch for blinking a turn signal lamp, (b) a lighting switch for turning on a headlamp, a small lamp, and a tail lamp, (c) a passing switch for headlight flashing, and (d) a dimmer switch for switching between high beam and low beam of the head lamp.

Wiper lever unit 130L is attached to casing 110 on the negative side of the X-axis direction, and is operated by the driver of vehicle 4 with his/her left hand, for example. Wiper lever unit 130L is a combination switch lever that includes, for example, (a) a front windshield wiper switch for operating a front windshield wiper, (b) a front windshield washer switch for spraying a washer fluid onto the front windshield, (c) a rear windshield wiper switch for operating a rear windshield wiper, and (d) a rear windshield washer switch for spraying a washer fluid onto the rear windshield.

Such turn lever unit 130R and wiper lever unit 130L are attached to casing 110 as operation portions that the driver operates. Such input device 100 is attached to steering shaft 300 such that the central axis of tubular portion 120 of casing 110 matches the central axis of steering shaft 300.

Figure 3:
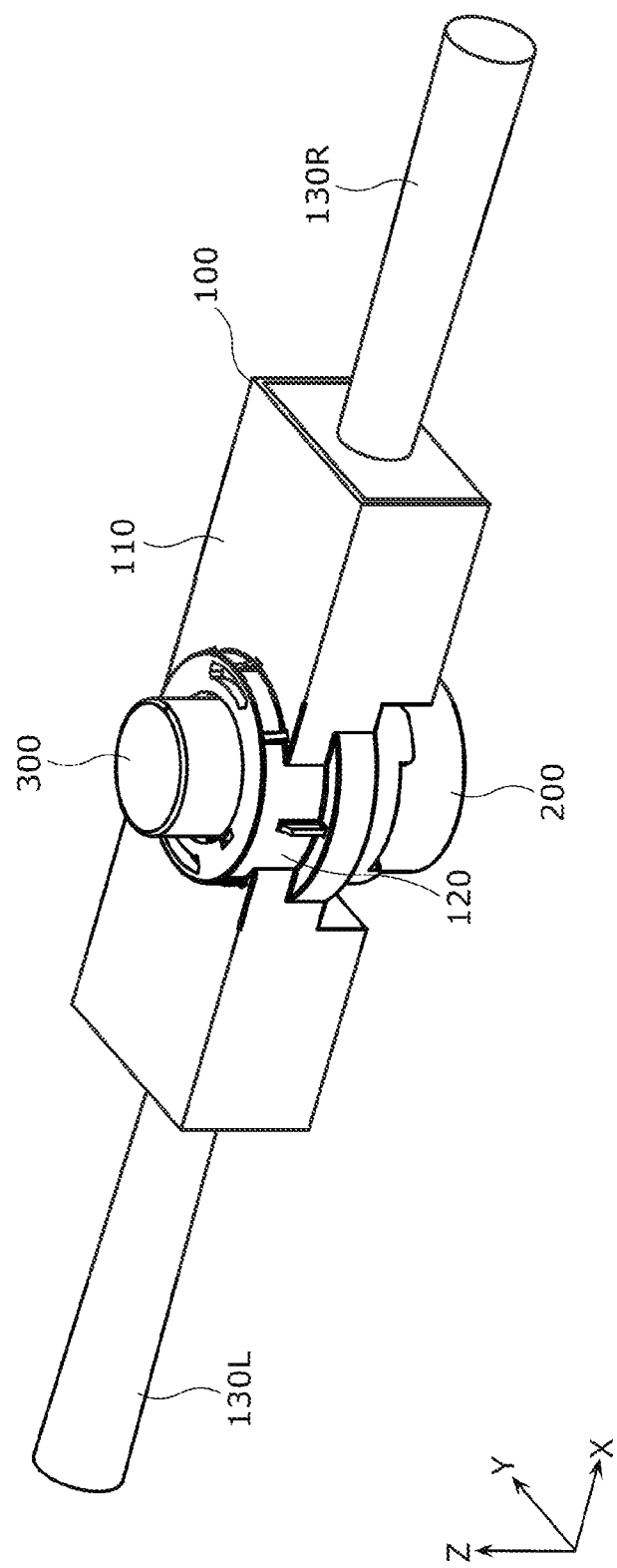
FIG. 3 is a perspective view schematically illustrating an appearance of the input device in Embodiment 1.
Figure 4:
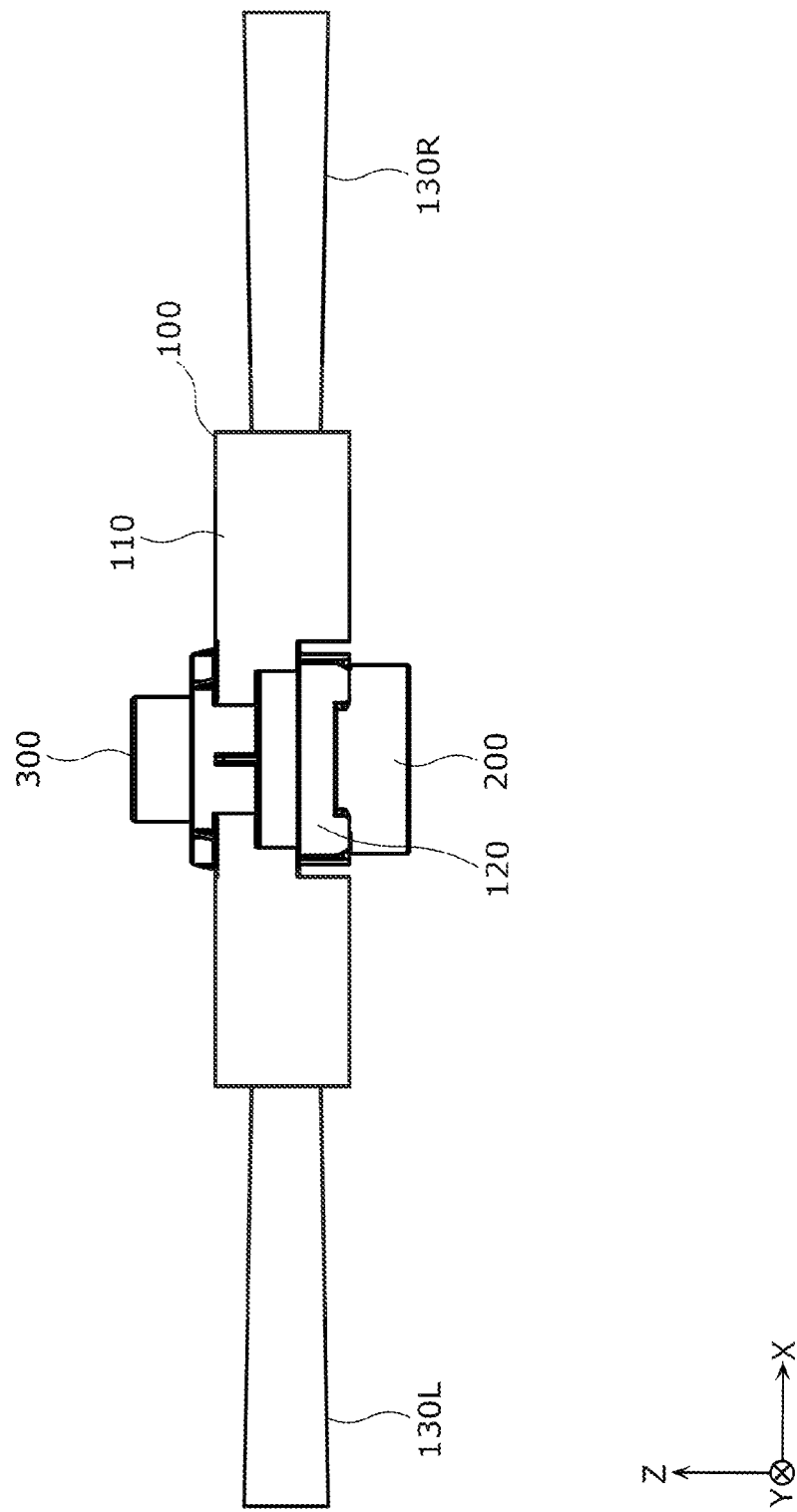
FIG. 4 is a front view schematically illustrating an appearance of the input device in Embodiment 1.

FIG. 3 is a perspective view schematically illustrating an appearance of input device 100 in the present embodiment, and FIG. 4 is a front view schematically illustrating an appearance of input device 100 in the present embodiment. Note that input device 100 according to the present embodiment is to be described in the following using schematic drawings in order to facilitate understanding of the description.

Input device 100 is attached to steering shaft 300 such that steering shaft 300 is put into tubular portion 120 of casing 110, as illustrated in FIG. 3 and FIG. 4. Steering shaft 300 is rotatably supported by column post 200. Specifically, column post 200 surrounds a portion of steering shaft 300 in the circumferential direction, and rotatably supports steering shaft 300 such that the central axis of steering shaft 300 serves as the rotation center.

Thus, when input device 100 is attached to steering shaft 300, steering shaft 300 is put into tubular portion 120 from the negative side of the Z-axis direction, and column post 200 is fitted in tubular portion 120. The opening of tubular portion 120 at an upper end portion (that is, on the positive side of the Z-axis direction) is smaller than the opening thereof at a lower end portion (that is, on the negative side of the Z-axis direction). Thus, in a state in which input device 100 is attached to steering shaft 300, the upper end portion of steering shaft 300 projects out of the upper end opening of tubular portion 120, whereas the upper end portion of column post 200 does not project out and is within tubular portion 120.

Figure 5:
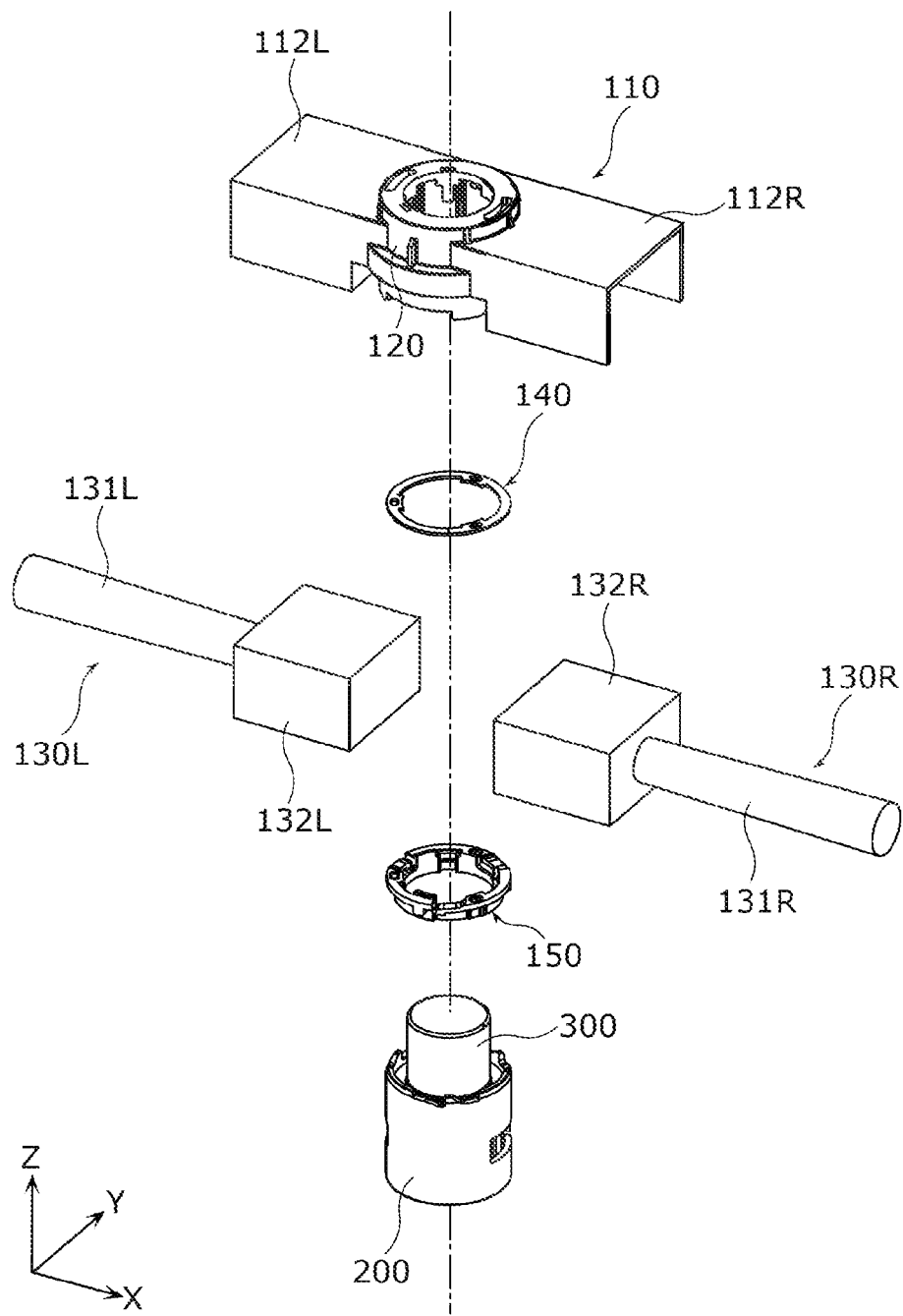
FIG. 5 is an exploded perspective view of the disassembled input device from above in Embodiment 1.
Figure 6:
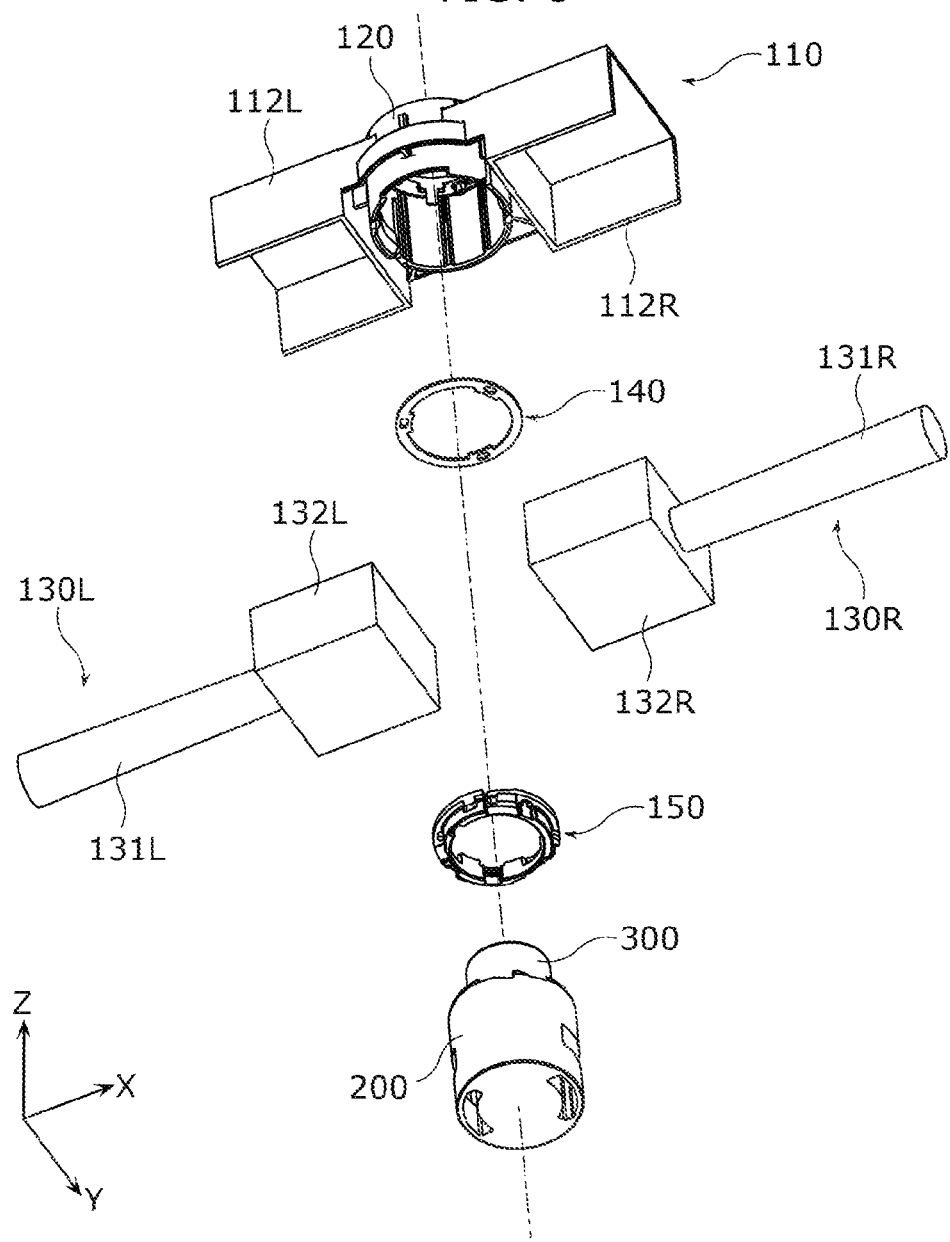
FIG. 6 is an exploded perspective view of the disassembled input device from below in Embodiment 1.

FIG. 5 is an exploded perspective view of disassembled input device 100 from above in the present embodiment, and FIG. 6 is an exploded perspective view of disassembled input device 100 from below in the present embodiment. Note that the dash-dot lines shown in FIG. 5 and FIG. 6 each correspond to the central axes of tubular portion 120 of casing 110, biasing member 140 and rotation restriction member 150 that are described later, steering shaft 300, and column post 200, and extend in the Z-axis direction. Rotation described later means rotation about such central axes.

Input device 100 includes biasing member 140 and rotation restriction member 150, in addition to casing 110, turn lever unit 130R, and wiper lever unit 130L, as illustrated in FIG. 5 and FIG. 6.

Turn lever unit 130R includes turn lever 131R and lever holder 132R. A mechanism that operates in response to turn lever 131R being operated, for example, is disposed in lever holder 132R. Wiper lever unit 130L includes wiper lever 131L and lever holder 132L. A mechanism that operates in response to wiper lever 131L being operated, for example, is disposed in lever holder 132L.

Casing 110 includes first holder attachment portion 112R disposed on the positive side of the X-axis direction relative to tubular portion 120, and second holder attachment portion 112L disposed on the negative side of the X-axis direction relative to tubular portion 120. Lever holder 132R of turn lever unit 130R is attached to first holder attachment portion 112R. Lever holder 132L of wiper lever unit 130L is attached to second holder attachment portion 112L.

Biasing member 140 is a metal plate member formed into a ring shape, for example, and put into tubular portion 120 of casing 110 from the negative side of the Z-axis direction. A brim portion is formed on an upper end portion on the inside surface of tubular portion 120. Biasing member 140 is disposed in contact with the brim portion.

Rotation restriction member 150 is a resin-molded member formed into a ring shape, for example, and put into tubular portion 120 of casing 110 from the negative side of the Z-axis direction. Rotation restriction member 150 is disposed in tubular portion 120 such that biasing member 140 is located between rotation restriction member 150 and the brim portion of tubular portion 120 stated above.

When such input device 100 is attached to steering shaft 300, steering shaft 300 passes through rotation restriction member 150, biasing member 140, and tubular portion 120. The upper end portion of column post 200 is fitted in tubular portion 120. At this time, the upper end portion of column post 200 is in contact with rotation restriction member 150 disposed in tubular portion 120. Thus, biasing member 140 and rotation restriction member 150 are located between the upper end portion of column post 200 and the brim portion formed on the upper end portion of the inside surface of tubular portion 120, in the Z-axis direction.

Figure 7:
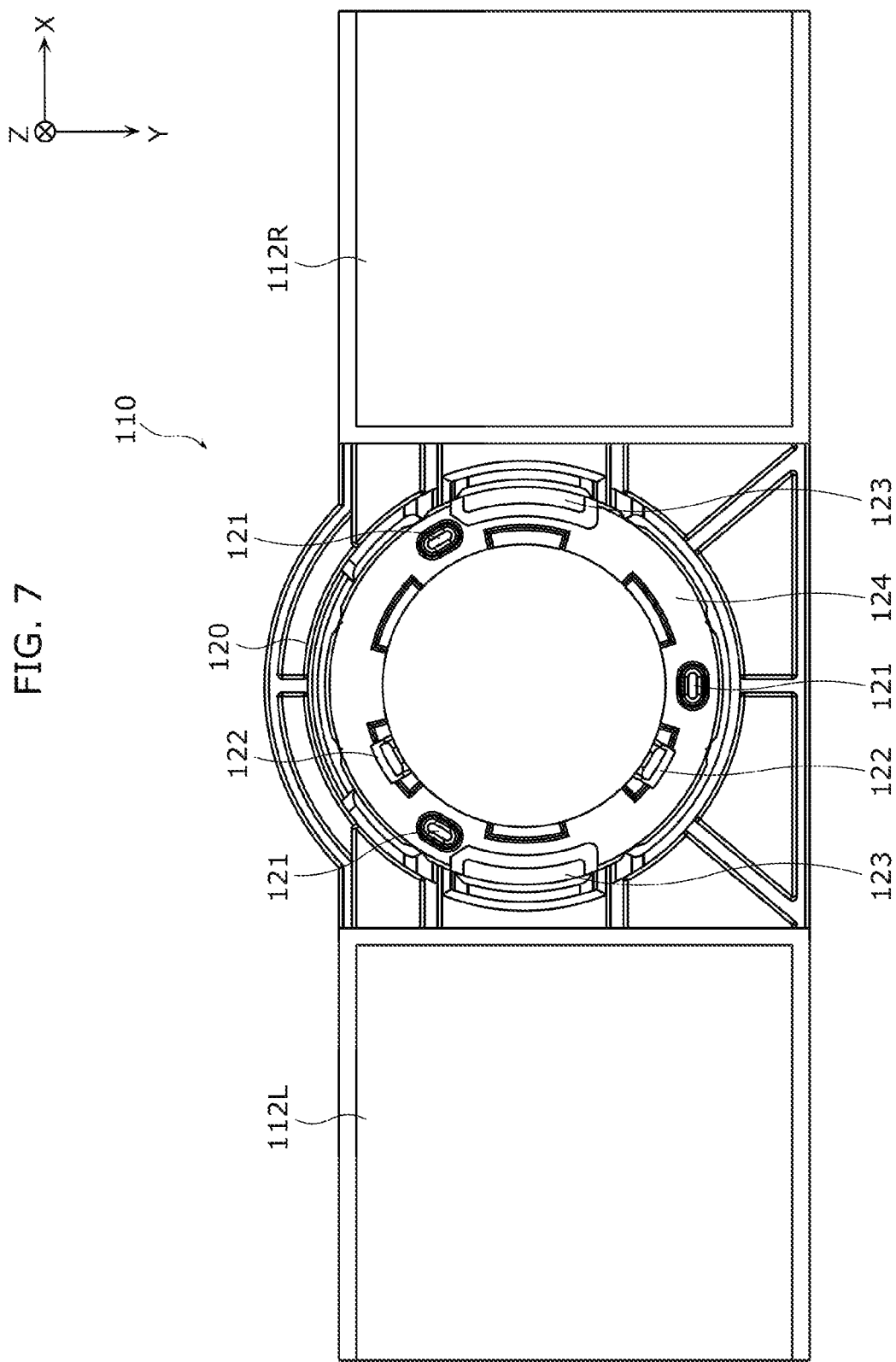
FIG. 7 is a bottom view of a casing in Embodiment 1.

FIG. 7 is a bottom view of casing 110 in the present embodiment. Specifically, FIG. 7 is a view of casing 110 from the negative side of the Z-axis direction.

Brim portion 124 described above is formed on the inside surface of tubular portion 120 of casing 110, and projects toward the central axis of tubular portion 120. Brim portion 124 in the present embodiment is formed into a ring shape at the upper end of the inside surface of tubular portion 120. Thus, the opening of tubular portion 120 at the upper end portion is smaller than the opening thereof at the lower end portion.

Furthermore, three protrusions 121 and two claws 122 are formed on the surface of brim portion 124 on the negative side of the Z-axis direction. Three protrusions 121 project in the negative Z-axis direction, and are used to reduce shifts of biasing member 140 and rotation restriction member 150, which are described above, along the XY plane. Two claws 122 project in the negative Z-axis direction. Furthermore, the tip end portions of claws 122 project in a direction away from the central axis of tubular portion 120 along the XY plane. Claws 122 are used to prevent biasing member 140 and rotation restriction member 150, which are described above, from falling in the negative Z-axis direction.

Tubular portion 120 includes two engaging portions 123. Engaging portions 123 engage with engaged portions formed in column post 200.

Figure 8:
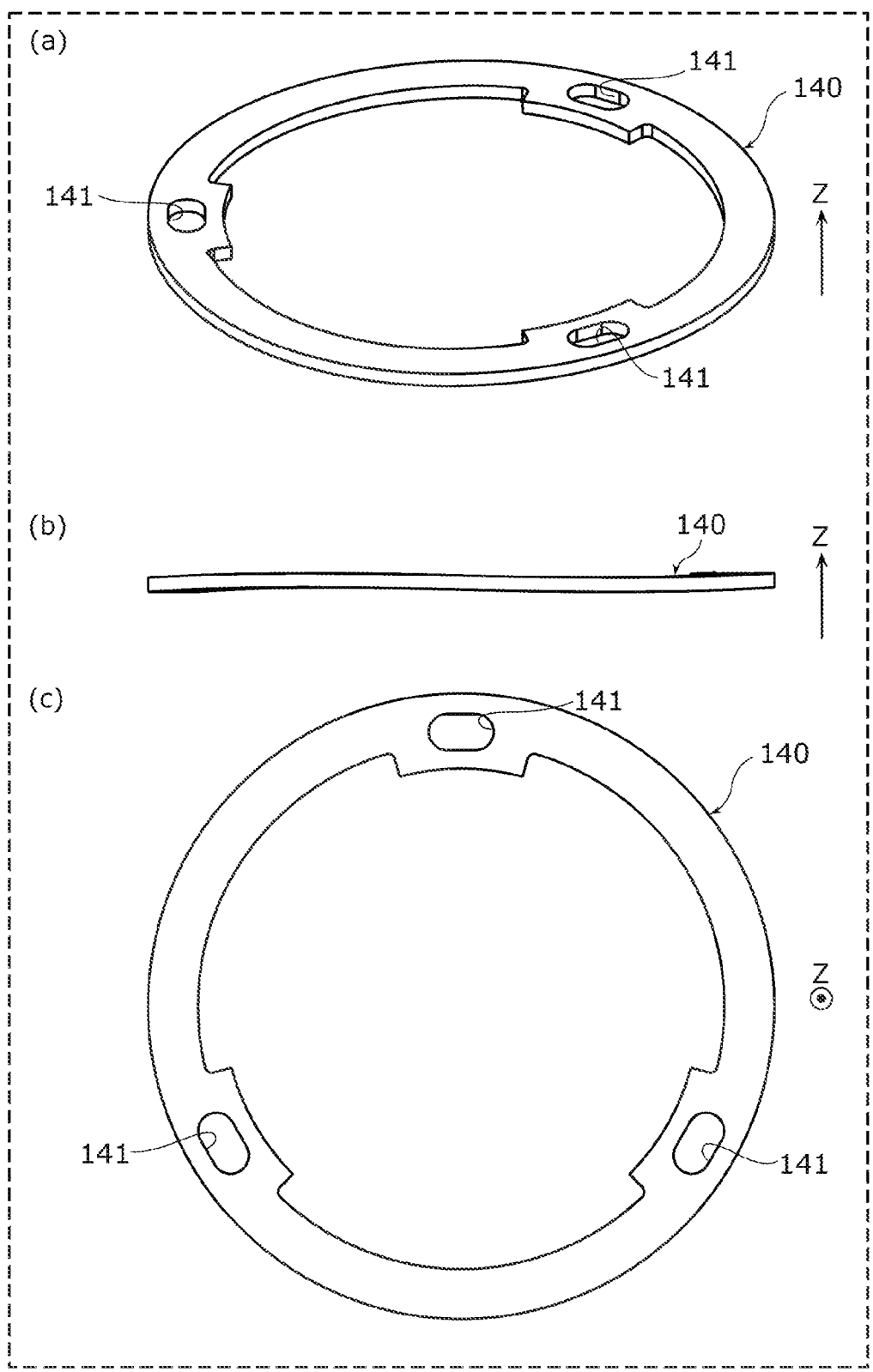
FIG. 8 illustrates appearances of a biasing member in Embodiment 1.

FIG. 8 illustrates appearances of biasing member 140 in the present embodiment. Specifically, (a) of FIG. 8 is a perspective view of biasing member 140, (b) of FIG. 8 illustrates a state of biasing member 140 viewed in a direction along the XV plane, and (c) of FIG. 8 is a top view of biasing member 140.

Three insertion holes 141 are formed in biasing member 140, as illustrated in (a) and (b) of FIG. 8. Protrusions 121 of casing 110 illustrated in FIG. 7 are put into insertion holes 141.

Furthermore, biasing member 140 in the present embodiment is a so-called waved washer, and is formed into a wavy shape that curves in the Z-axis direction as illustrated in (b) of FIG. 8. Stated differently, biasing member 140 has a shape that curves in the central axis direction of tubular portion 120, that is, the Z-axis direction. In this manner, biasing member 140 is elastic in the Z-axis direction. Note that such biasing member 140 elastically deforms so as to be compressed by 0.3 mm to 0.8 mm in the Z-axis direction, for example, thus producing a 180-N biasing force in the Z-axis direction.

Figure 9A:
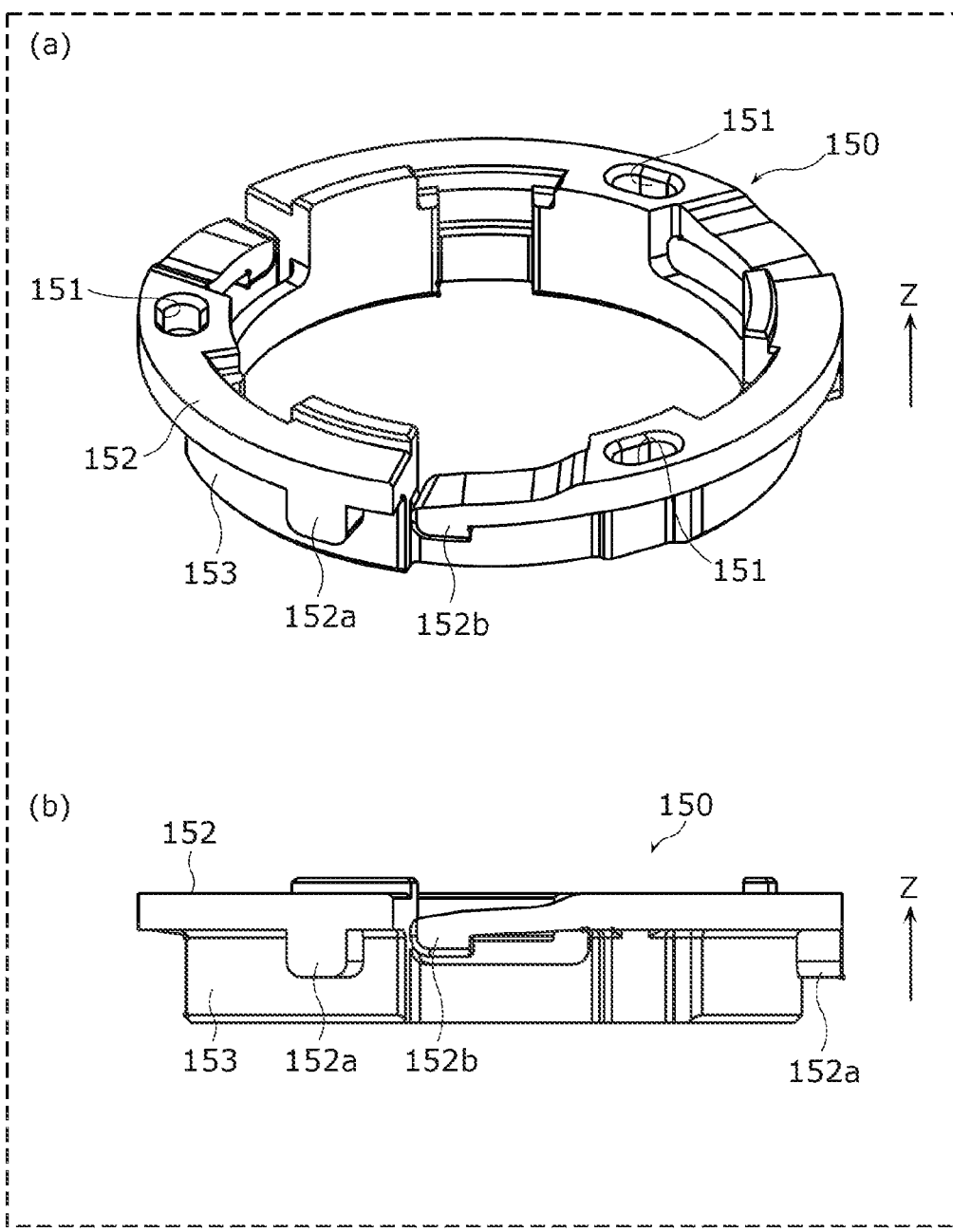
FIG. 9A illustrates appearances of a rotation restriction member in Embodiment 1.
Figure 9B:
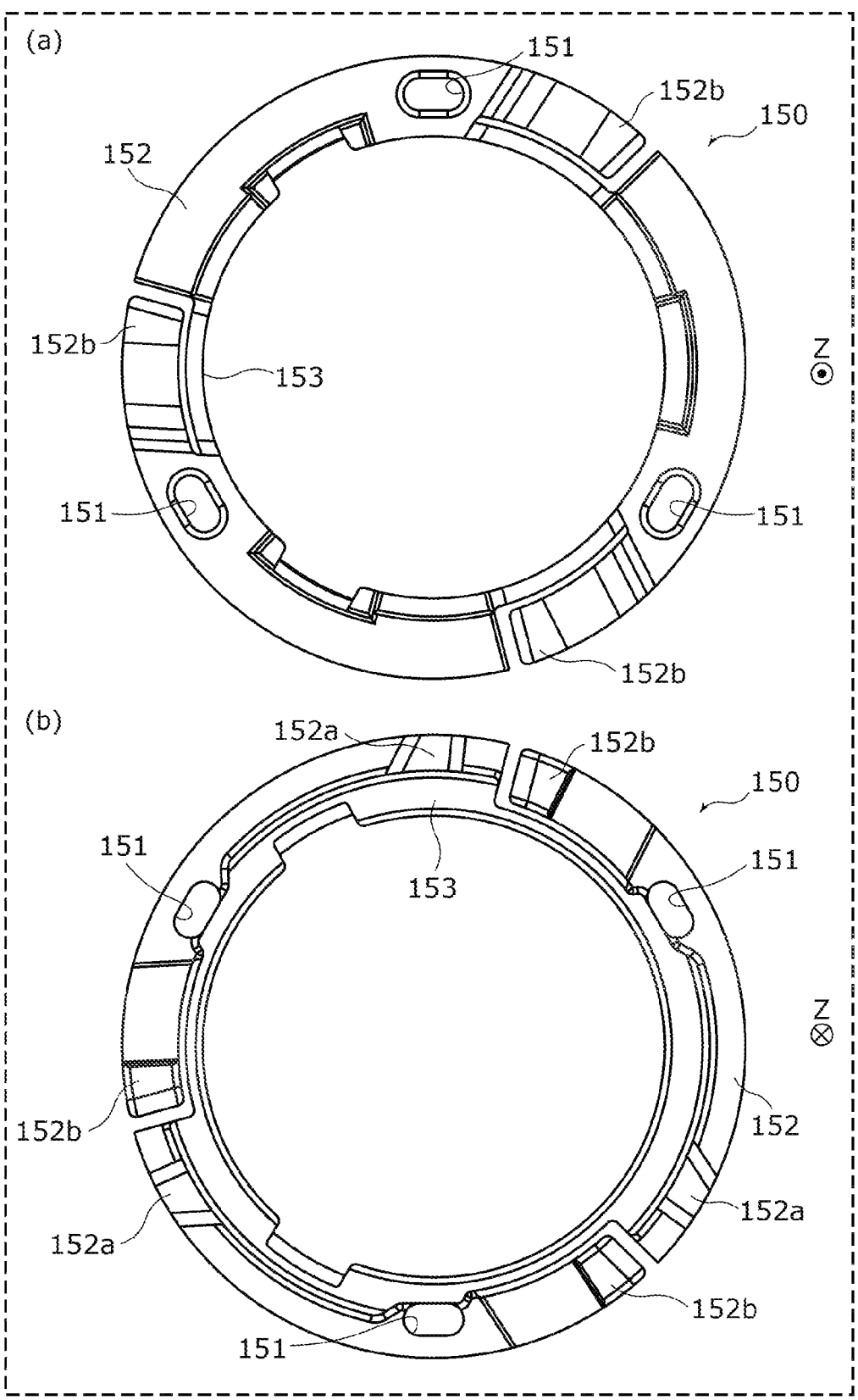
FIG. 9B illustrates other appearances of the rotation restriction member in Embodiment 1.

FIG. 9A illustrates appearances of rotation restriction member 150 in the present embodiment. Specifically, (a) of FIG. 9A is a perspective view of rotation restriction member 150, and (b) of FIG. 9A illustrates a state of rotation restriction member 150 viewed in a direction along the XY plane. FIG. 9B illustrates other appearances of rotation restriction member 150 in the present embodiment. Specifically, (a) of FIG. 9B is a top view of rotation restriction member 150, and (b) of FIG. 9B is a bottom view of rotation restriction member 150.

Rotation restriction member 150 includes base 152, three projections 152*a*, and fitted portion 153.

Fitted portion 153 is formed into a ring shape, and is fitted in the upper end opening of tubular column post 200.

Base 152 is substantially ring-shaped, projecting outward from the upper end of fitted portion 153 along the XY plane. Thus, base 152 faces the upper end of column post 200 in the Z-axis direction in a state in which fitted portion 153 is fitted in the upper end opening of column post 200.

Moreover, three insertion holes 151 are formed in base 152, similarly to biasing member 140. Protrusions 121 of casing 110 described above are put into insertion holes 151.

Furthermore, base 152 includes three rotation engaging portions 152*b*. Rotation engaging portions 152*b* bend in the central axis direction of tubular portion 120 (that is, the Z-axis direction), and project toward column post 200 (that is, in the negative Z-axis direction).

Three projections 152*a* each project in the negative z-axis direction from base 152. Thus, projections 152*a* project from base 152 and come into contact with column post 200. Rotation restriction member 150 presses and elastically deforms biasing member 140 by projections 152*a* being in contact with column post 200.

Figure 10:
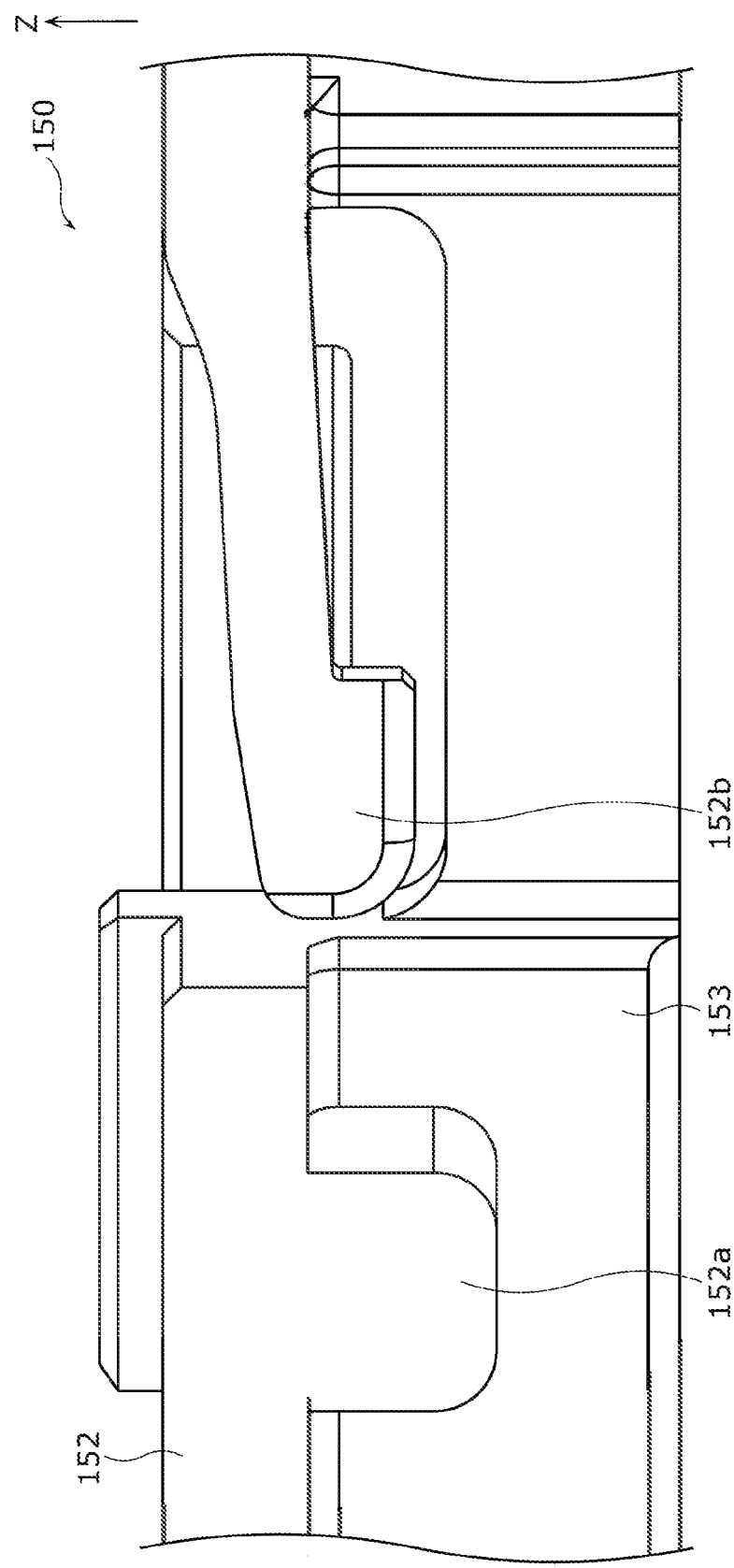
FIG. 10 is an enlarged view of a portion of the rotation restriction member in Embodiment 1.

FIG. 10 is an enlarged view of a portion of rotation restriction member 150 in the present embodiment. Specifically, FIG. 10 is an enlarged view of projection 152*a* and rotation engaging portion 152*b* of rotation restriction member 150 which are illustrated in (b) of FIG. 9A.

Projection 152*a* and rotation engaging portion 152*b* are put into recesses formed in the upper end of column post 200. As a result, rotation of rotation restriction member 150 relative to column post 200 is restricted.

Figure 11:
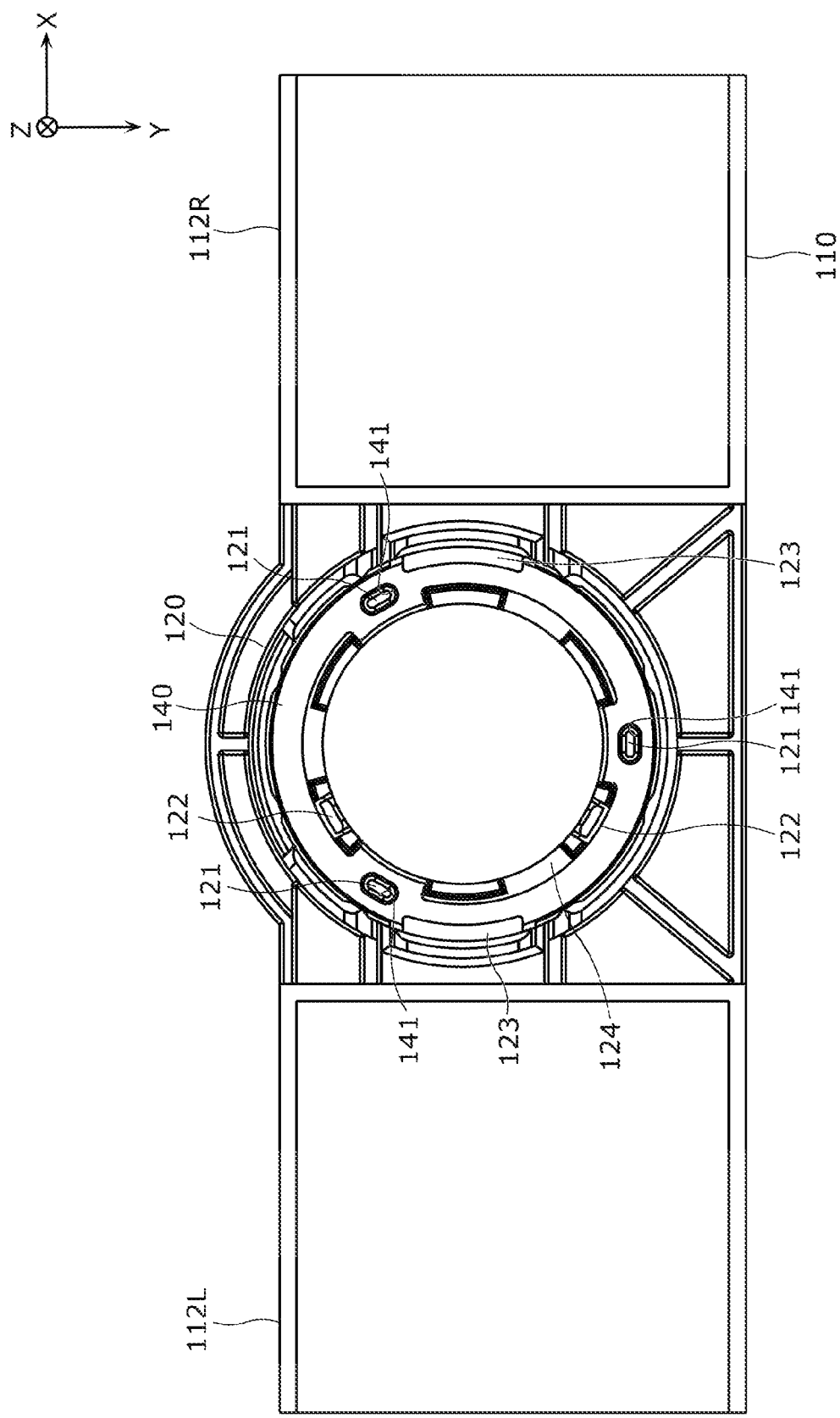
FIG. 11 is a bottom view of the casing to which a biasing member is attached in Embodiment 1.

FIG. 11 is a bottom view of casing 110 to which biasing member 140 is attached in the present embodiment.

Biasing member 140 is placed on the surface of brim portion 124 of tubular portion 120 on the negative side of the Z-axis direction, as illustrated in FIG. 11. At this time, three protrusions 121 formed on brim portion 124 are put in three insertion holes 141 of biasing member 140. Accordingly, a shift of biasing member 140 along the XY plane relative to brim portion 124 is reduced.

Figure 12:
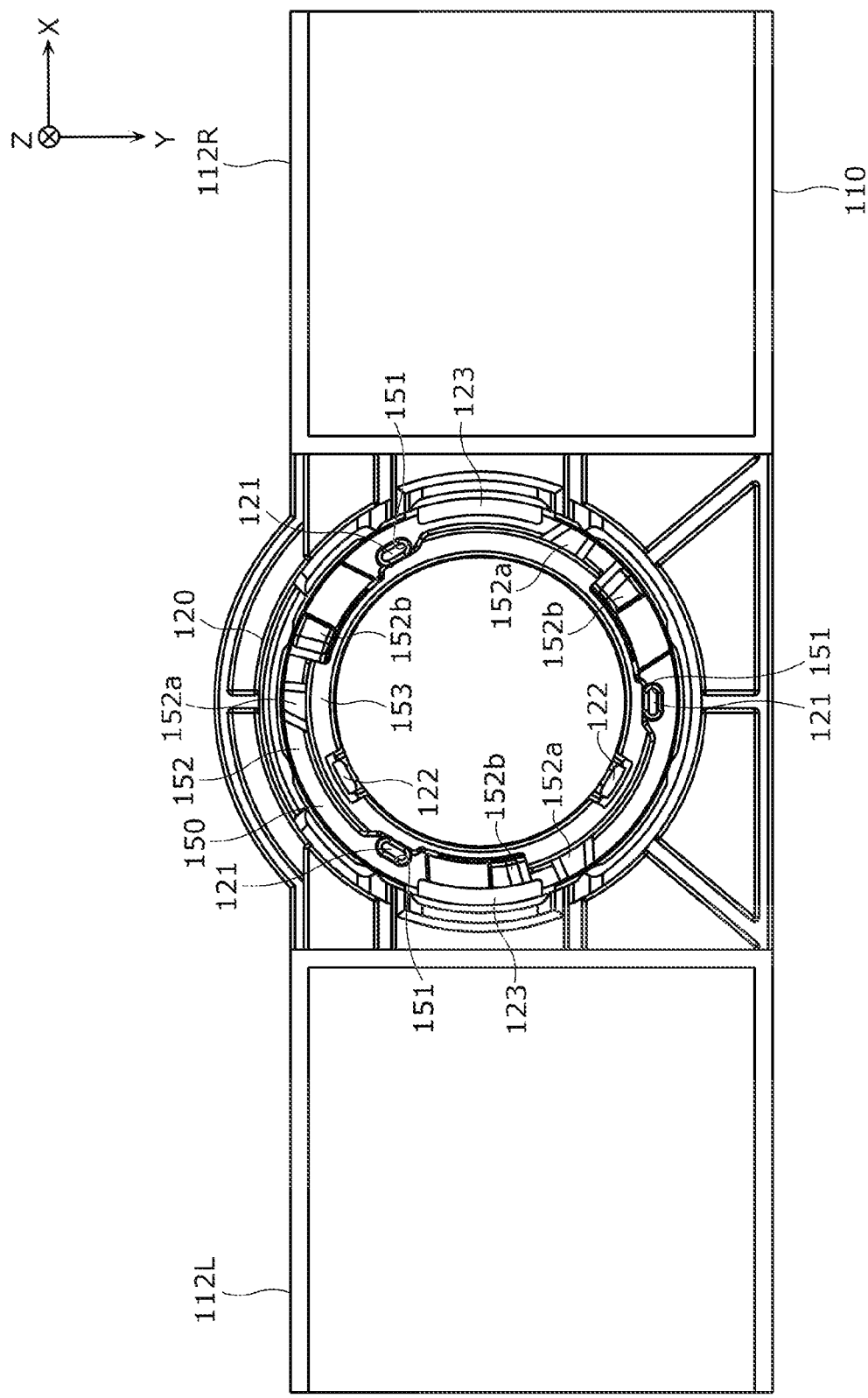
FIG. 12 is a bottom view of the casing to which the biasing member and the rotation restriction member are attached in Embodiment 1.

FIG. 12 is a bottom view of casing 110 to which biasing member 140 and rotation restriction member 150 are attached in the present embodiment.

Rotation restriction member 150 is disposed under and overlap biasing member 140 placed in tubular portion 120, as illustrated in FIG. 12. Thus, rotation restriction member 150 is disposed in tubular portion 120 such that biasing member 140 is located between rotation restriction member 150 and the surface of brim portion 124 on the negative side of the Z-axis direction. When rotation restriction member 150 is disposed in tubular portion 120, base 152 of rotation restriction member 150 faces biasing member 140, and projections 152*a* and rotation engaging portions 152*b* face opposite from biasing member 140.

Rotation restriction member 150 disposed in such a manner is supported by two claws 122 of tubular portion 120 so as to be prevented from falling in the negative Z-axis direction.

Figure 13:
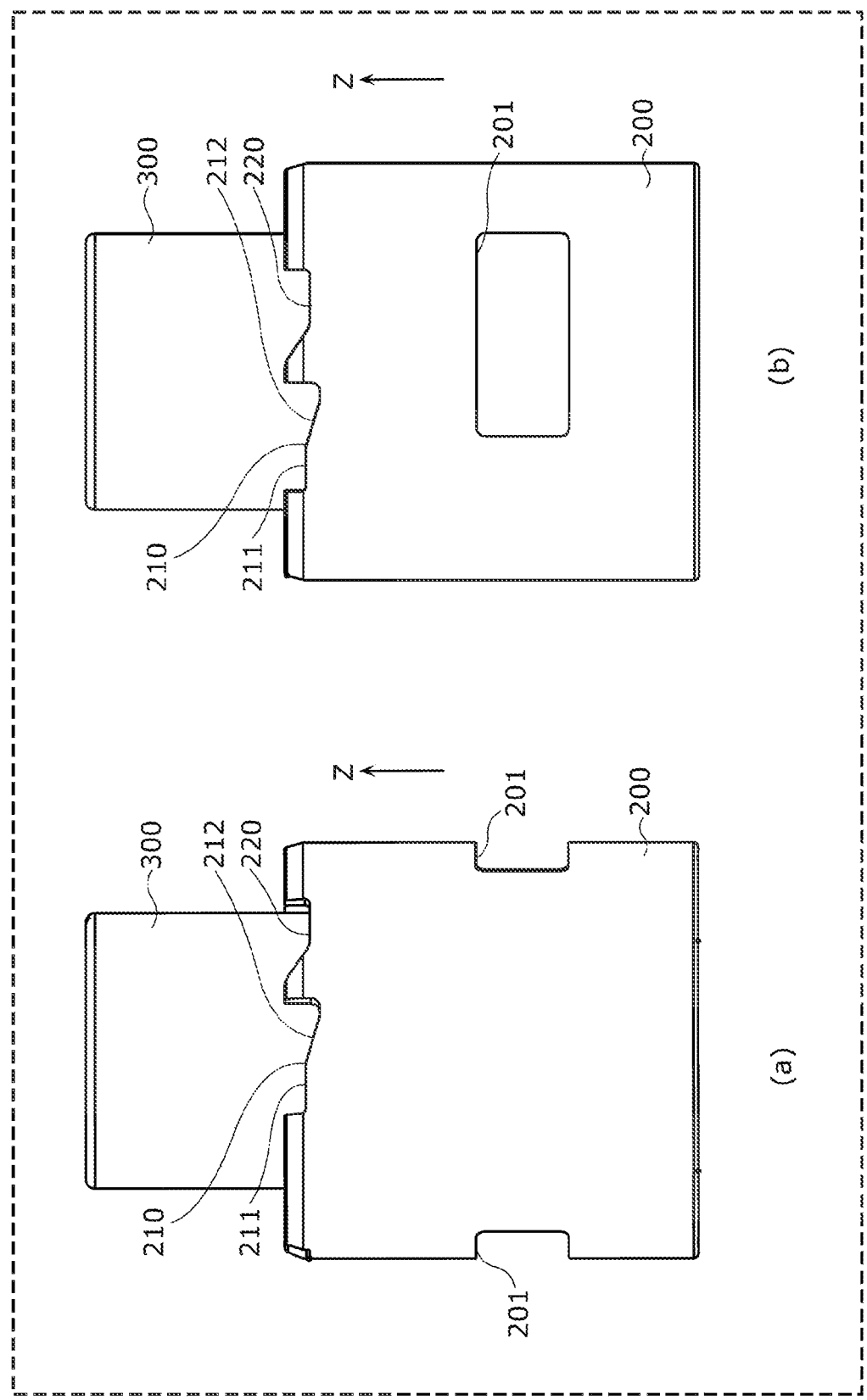
FIG. 13 illustrates a steering shaft and a column post in Embodiment 1.

FIG. 13 illustrates steering shaft 300 and column post 200 in the present embodiment. Note that (a) of FIG. 13 illustrates steering shaft 300 and column post 200 viewed in a direction along the XY plane, and (b) of FIG. 13 illustrates steering shaft 300 and column post 200 viewed in another direction along the XY plane.

Steering shaft 300 is rotatably supported by column post 200, as illustrated in FIG. 13. Column post 200 is formed into a cylindrical shape, for example. Steering shaft 300 is put in column post 200 such that the upper end portion thereof projects out of column post 200 in the positive Z-axis direction.

First recesses 210 and second recesses 220 that are recessed in the negative Z-axis direction are formed in the upper end of column post 200. Note that FIG. 13 illustrates only one set of first recess 210 and second recess 220, but nevertheless three sets thereof are formed in the upper end of column post 200.

When input device 100 is attached to steering shaft 300, projection 152a and rotation engaging portion 152b of rotation restriction member 150 are put in each first recess 210.

Second recesses 220 are temporarily used to attach input device 100 to steering shaft 300. At this time, rotation engaging portion 152b of rotation restriction member 150 is put in each second recess 220.

Two engaged portions 201 are formed in lateral portions of column post 200. Two engaged portions 201 are formed of perimeter portions of through holes having a substantially rectangular shape, and are provided on the opposite sides on the XY plane. Engaging portions 123 of tubular portion 120 engage with engaged portions 201 in the Z-axis direction. Specifically, when the upper end portion of column post 200 is fitted in tubular portion 120, engaging portions 123 of tubular portion 120 engage with engaged portions 201 of column post 200. Accordingly, a shift of tubular portion 120 in the Z-axis direction, or more specifically, a shift of tubular portion 120 in the positive Z-axis direction from column post 200 is reduced.

Figure 14:
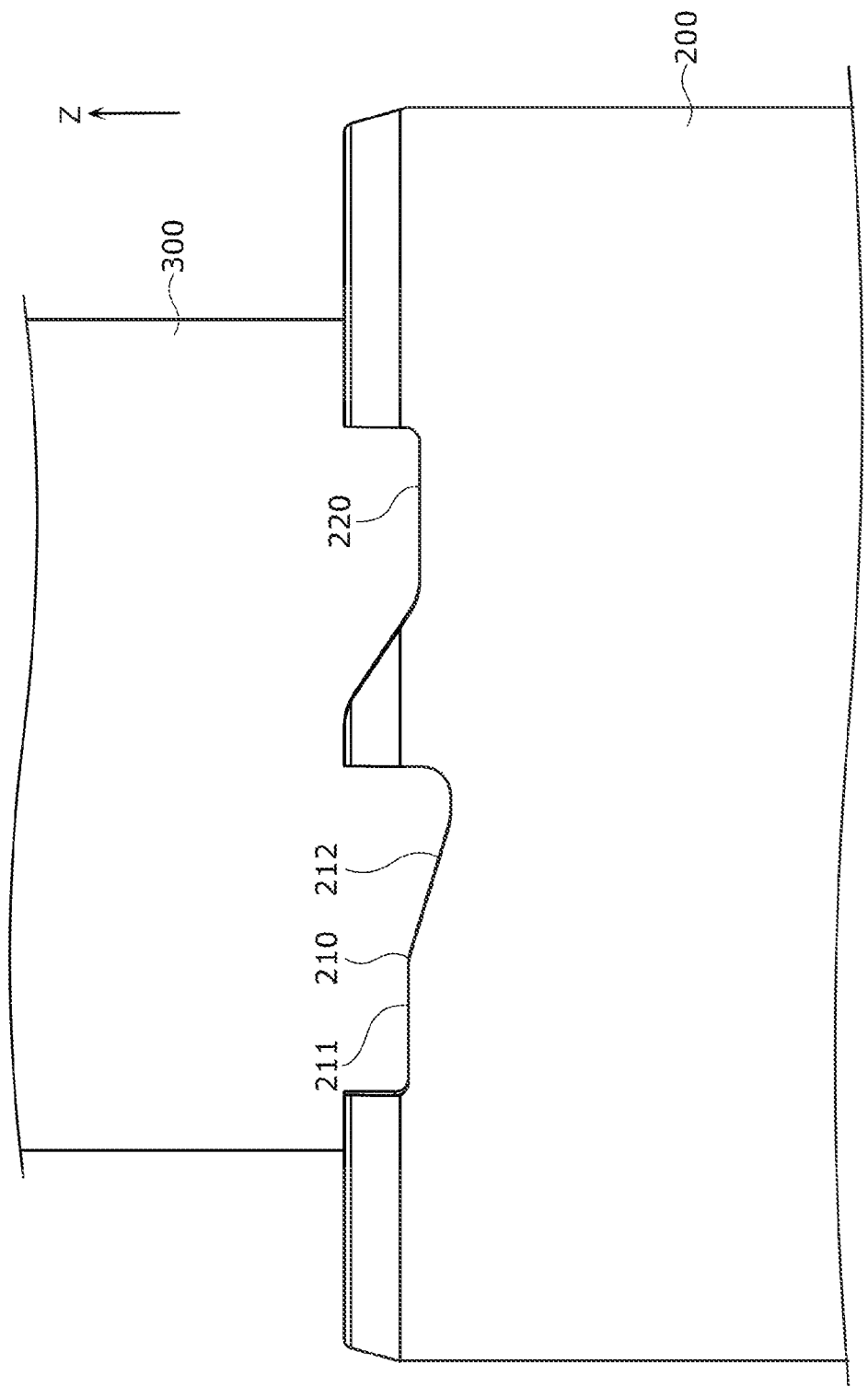
FIG. 14 is an enlarged view showing a portion of the steering shaft and a portion of the column post in Embodiment 1.

FIG. 14 is an enlarged view showing a portion of steering shaft 300 and a portion of column post 200 in the present embodiment.

The bottom surface of first recess 210 includes non-sloping bottom surface 211 and sloping bottom surface 212. Non-sloping bottom surface 211 is substantially perpendicular to the central axis of column post 200 (that is, the Z axis), and sloping bottom surface 212 has a slope that increases the depth of first recess 210 with distance from non-sloping bottom surface 211. Note that the depth is a depth in the Z-axis direction. Thus, non-sloping bottom surface 211 is in a shallower location than sloping bottom surface 212.

The lateral surface of second recess 220 closer to first recess 210 has a slope that decreases the depth of second recess 220 with a decrease in distance from first recess 210.

Figure 15:
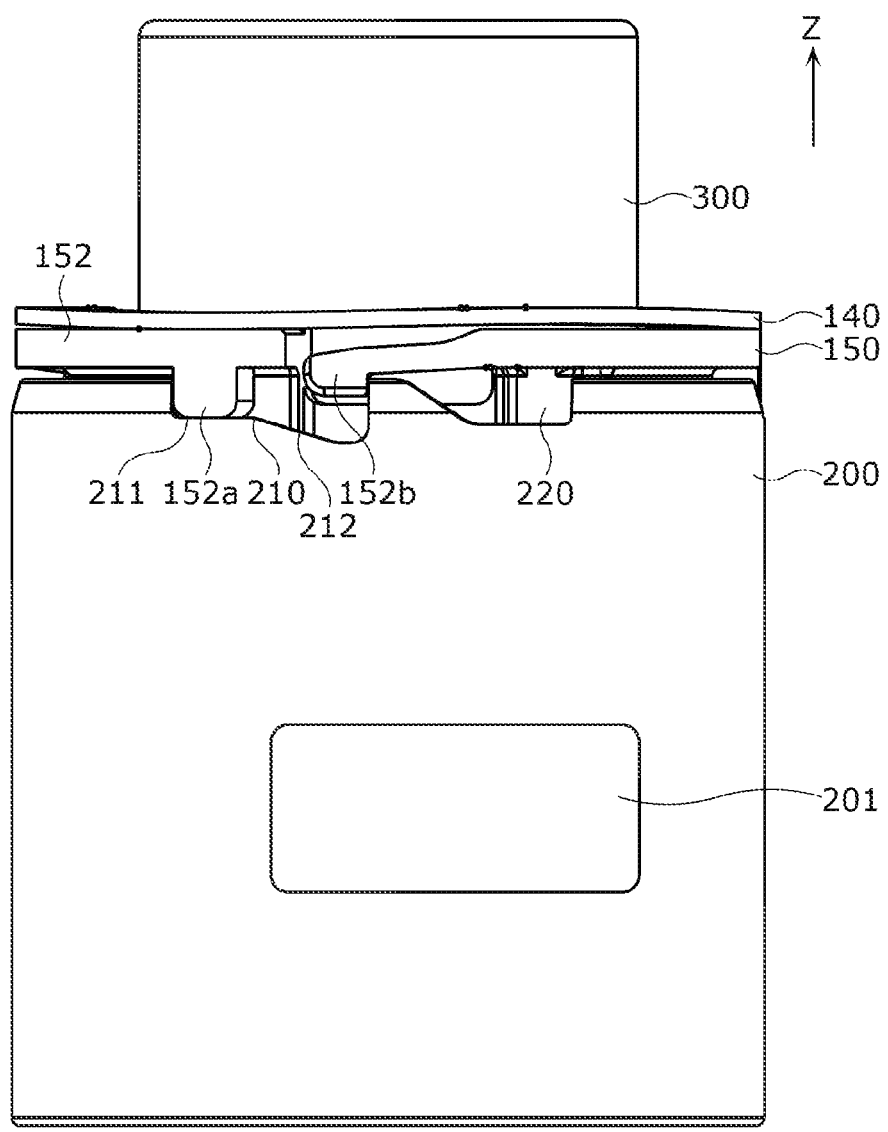
FIG. 15 illustrates disposition of the biasing member, the rotation restriction member, and the column post in Embodiment 1.

FIG. 15 illustrates disposition of biasing member 140, rotation restriction member 150, and column post 200.

Biasing member 140, rotation restriction member 150, and column post 200 are disposed as illustrated in FIG. 15 when input device 100 is attached to steering shaft 300. Thus, biasing member 140 and rotation restriction member 150 are placed above the upper end of column post 200 in a state in which steering shaft 300 passes through biasing member 140 and rotation restriction member 150. Stated differently, rotation restriction member 150 is placed on the upper end of column post 200, and biasing member 140 is placed on rotation restriction member 150.

Here, projection 152a and rotation engaging portion 152b of rotation restriction member 150 are put in first recess 210, as illustrated in FIG. 15. Projection 152a is in contact with one of two lateral surfaces of first recess 210, and rotation engaging portion 152b is in contact with a remaining one of the lateral surfaces. Accordingly, rotation of rotation restriction member 150 relative to column post 200 is restricted.

Furthermore, projection 152a is in contact with non-sloping bottom surface 211 of first recess 210 of column post 200. Since non-sloping bottom surface 211 is in a shallower location than sloping bottom surface 212, base 152 of rotation restriction member 150 pushes up biasing member 140 in the positive Z-axis direction by projection 152a being in contact with non-sloping bottom surface 211. Here, brim portion 124 of tubular portion 120 is disposed on biasing member 140 on the positive side of the Z-axis direction, and thus biasing member 140 pushed up by base 152 in the positive Z-axis direction is pressed toward brim portion 124. Thus, biasing member 140 biases brim portion 124 in a direction in which brim portion 124 moves away from column post 200 in the central axis direction (that is, the Z-axis direction).

Figure 16:
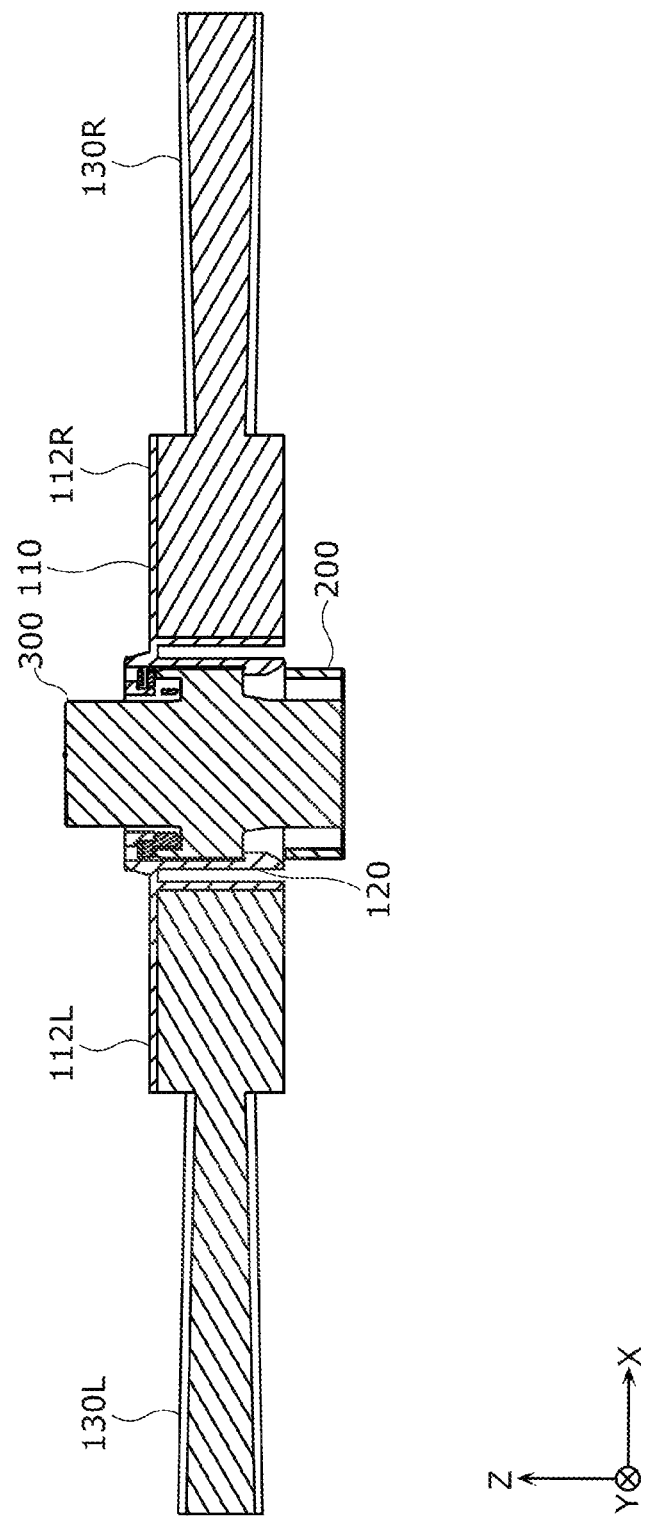
FIG. 16 is a cross sectional view of the input device along the XZ plane in Embodiment 1.
Figure 17:
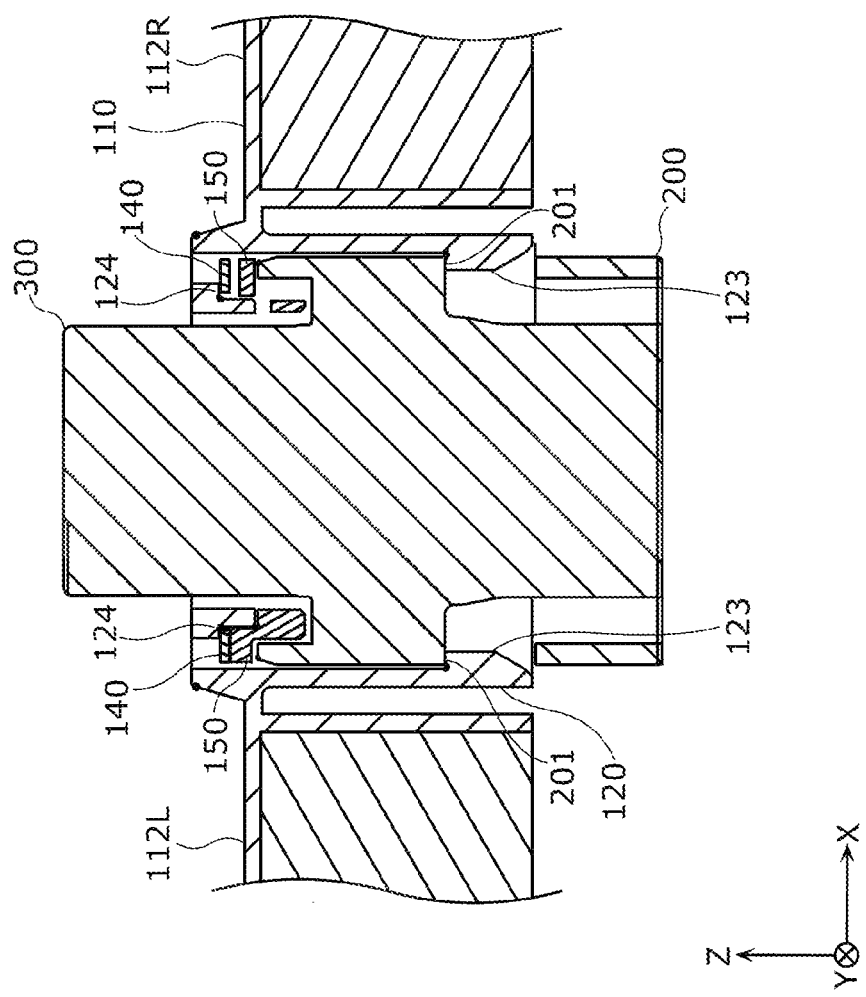
FIG. 17 is an enlarged view illustrating a portion of a cross section of the input device along the XZ plane in Embodiment 1.

FIG. 16 is a cross sectional view of input device 100 along the XZ plane in the present embodiment, and FIG. 17 is an enlarged view of a portion of the cross section along the XZ plane. Note that in the cross sectional views illustrated in FIG. 16 and FIG. 17, steering shaft 300 and column post 200 are shown as a unified structure, to facilitate understanding of the description.

When input device 100 is attached to steering shaft 300, as illustrated in FIG. 17, engaging portions 123 of tubular portion 120 of casing 110 engage with engaged portions 201 of column post 200. Biasing member 140 and rotation restriction member 150 are located between the upper end of column post 200 and brim portion 124 of tubular portion 120 in the Z-axis direction. At this time, biasing member 140 is pressed and elastically deformed in the positive Z-axis direction, by projections 152a being in contact with column post 200. With such elastic deformation, biasing member 140 biases brim portion 124 in a direction in which brim portion 124 moves away from column post 200 in the central axis direction (that is, the Z-axis direction).

Figure 18:
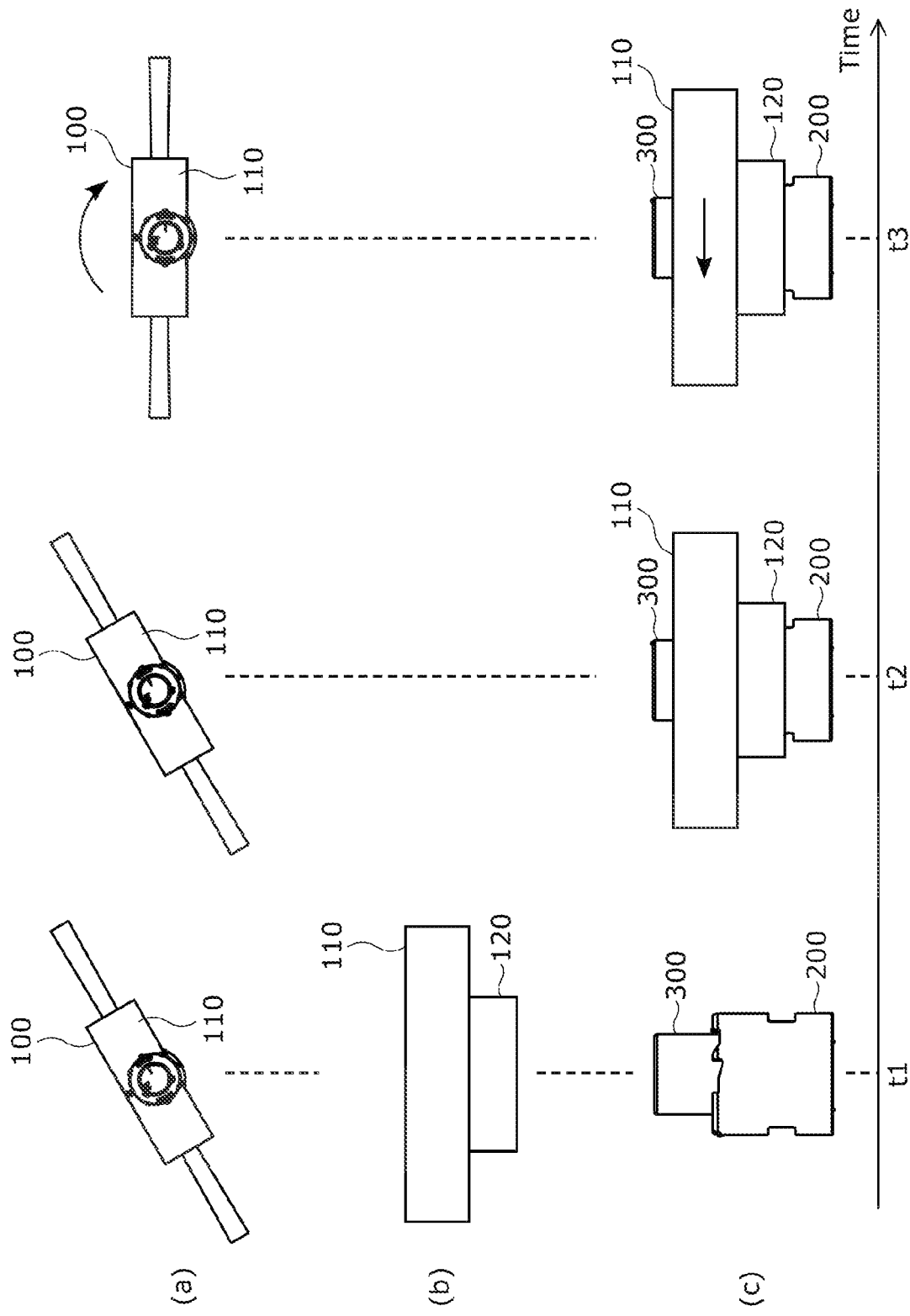
FIG. 18 illustrates the order in which the input device is attached to the steering shaft in Embodiment 1.

FIG. 18 illustrates the order in which input device 100 is attached to steering shaft 300 in the present embodiment. Note that (a) of FIG. 18 illustrates a chronological change in the state of input device 100 when input device 100 is viewed from above. Further, (b) and (c) of FIG. 18 illustrate chronological changes in the states of casing 110 of input device 100 and steering shaft 300 and column post 200, when casing 110, steering shaft 300, and column post 200 are viewed in the direction along the XV plane.

For example, first, at time t1, the central axis of tubular portion 120 of casing 110 of input device 100 and the central axes of steering shaft 300 and column post 200 are aligned with one another. At this time, the lower end opening of tubular portion 120 is directed toward steering shaft 300 and column post 200. At this time, input device 100 is disposed with the longer direction of input device 100 being tilted relative to the horizontal direction, for example.

Next, at time t2, the upper end portion of steering shaft 300 passes through tubular portion 120, and the upper end portion of column post 200 is fitted into tubular portion 120.

At time t3, input device 100 is rotated about the central axes described above to cause the longer direction of input device 100 tilted relative to the horizontal direction to be in the horizontal direction. Accordingly, casing 110 is rotated clockwise, for example, relative to steering shaft 300 and column post 200. With such rotation, input device 100 is fixed to column post 200 and attached to steering shaft 300.

Figure 19:
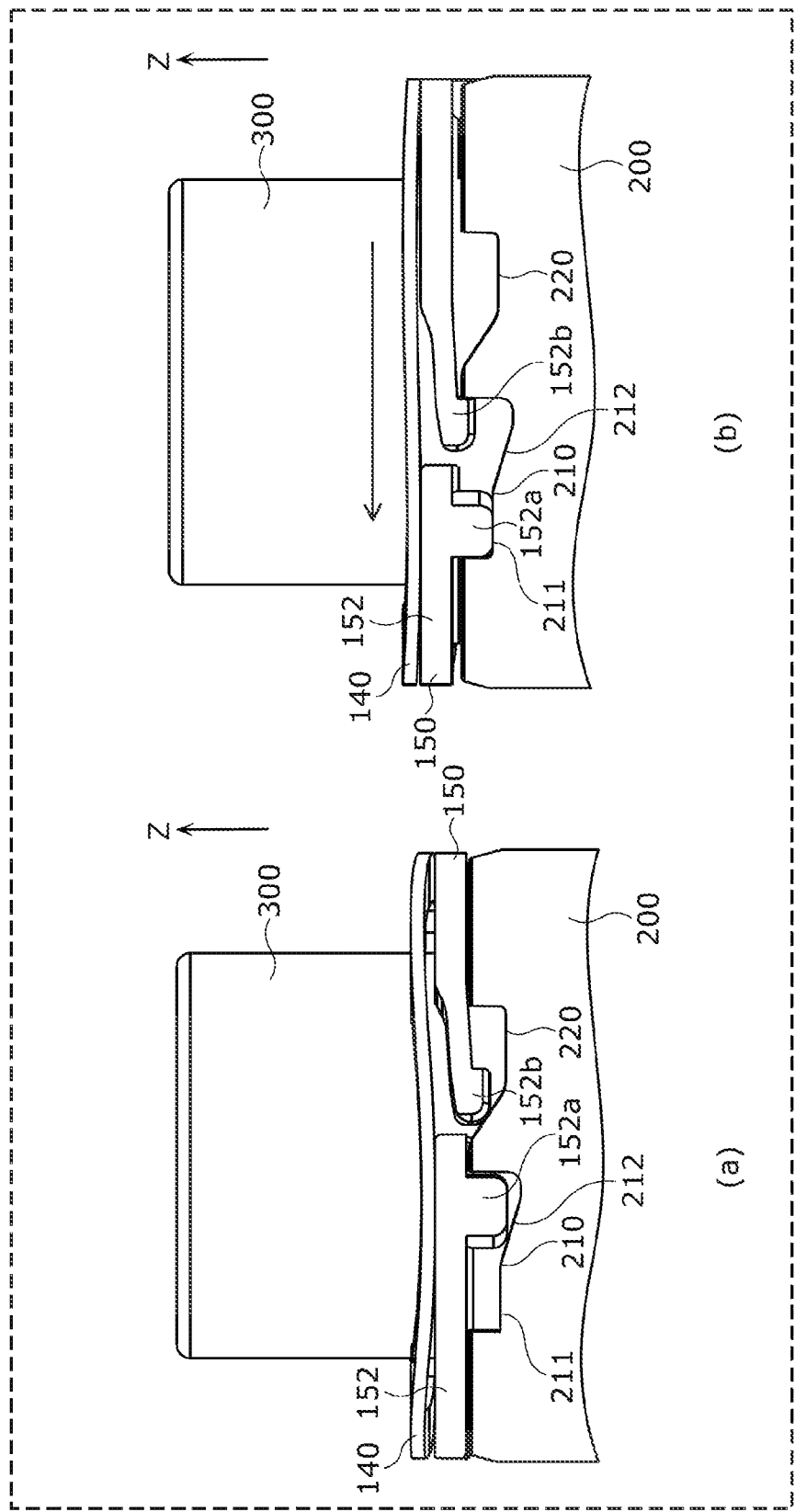
FIG. 19 illustrates movement of the rotation restriction member and the biasing member when the input device is attached to the steering shaft in Embodiment 1.
Figure 20:
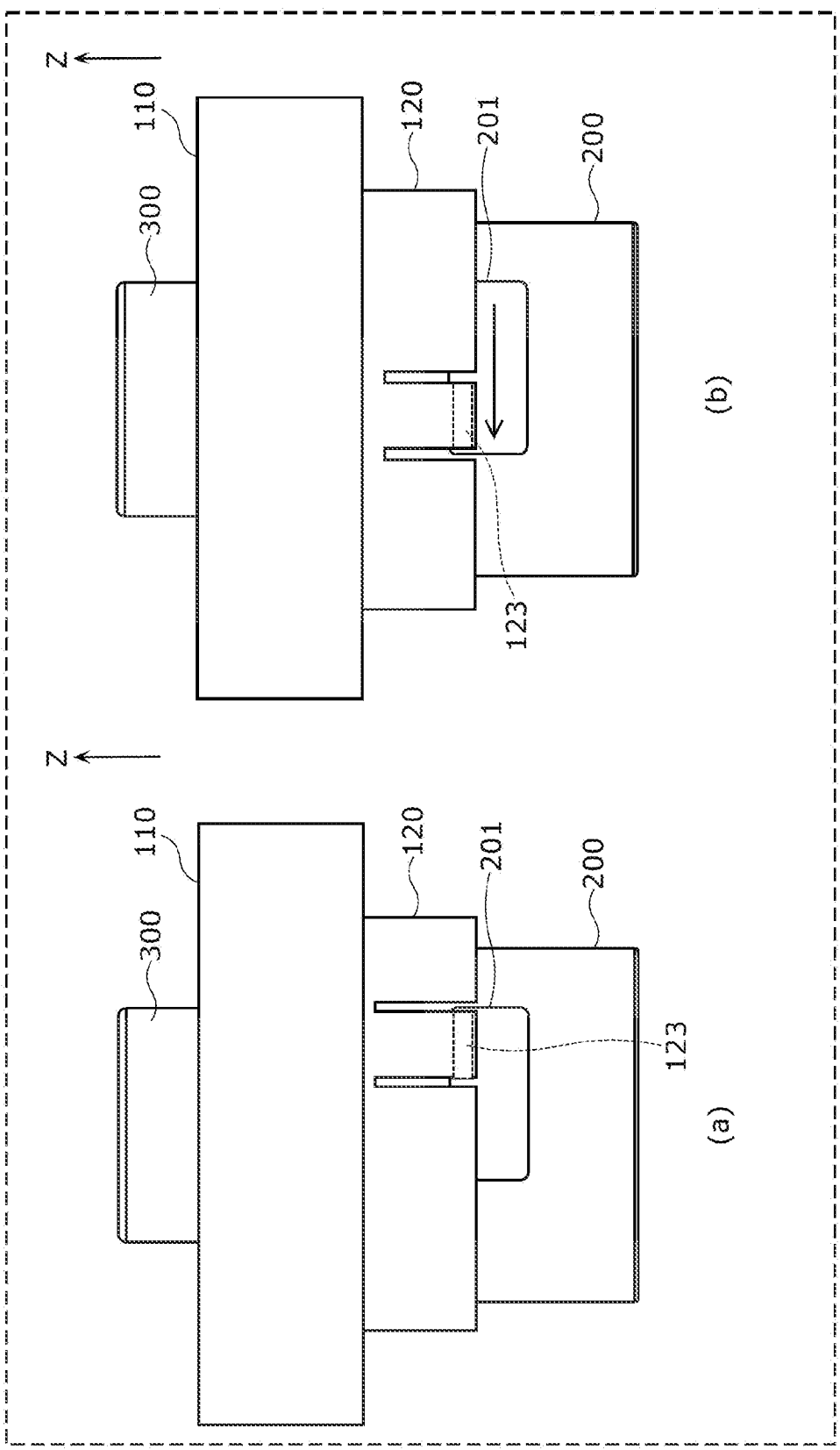
FIG. 20 illustrates movement of an engaging portion when the input device is attached to the steering shaft in Embodiment 1.

FIG. 19 illustrates movement of rotation restriction member 150 and biasing member 140 when input device 100 is attached to steering shaft 300 in the present embodiment. Specifically, (a) of FIG. 19 illustrates states of rotation restriction member 150 and biasing member 140 at time t2 in FIG. 18, and (b) of FIG. 19 illustrates states of rotation restriction member 150 and biasing member 140 at time t3 in FIG. 18. FIG. 20 illustrates movement of engaging portion 123 when input device 100 is attached to steering shaft 300 in the present embodiment. Specifically, (a) of FIG. 20 illustrates a state of engaging portion 123 at time t2 in FIG. 18, and (b) of FIG. 20 illustrates a state of engaging portion 123 at time t3 in FIG. 18.

When the upper end portion of column post 200 is fitted in tubular portion 120 in a state in which input device 100 is tilted, engaging portion 123 of tubular portion 120 engages with engaged portion 201 of column post 200 as illustrated in (a) of FIG. 20. Thus, engaging portion 123 engages with an upper portion of the perimeter portion, that is, the upper edge portion of the substantially rectangular through hole formed in the lateral portion of column post 200. More specifically, engaging portion 123 engages with a portion of the upper edge portion on one end side (the right side in FIG. 20) in the circumferential direction. Note that tubular portion 120 includes two engaging portions 123, and thus each of engaging portions 123 engages with engaged portion 201 of column post 200 corresponding to the engaging portion. As a result, tubular portion 120 is temporarily fastened to column post 200. Thus, tubular portion 120 is prevented from being separated from column post 200 in the positive Z-axis direction.

At this time, as illustrated in (a) of FIG. 19, projection 152a of rotation restriction member 150 is put in first recess 210 of column post 200, and rotation engaging portion 152b of rotation restriction member 150 is put in second recess 220 of column post 200. Projection 152a is disposed in a location that faces sloping bottom surface 212 within the bottom surface of first recess 210.

Next, input device 100 is rotated clockwise, for example, in order to eliminate the tilt of input device 100. Thus, casing 110 of input device 100 is rotated clockwise. Accordingly, engaging portion 123 formed in tubular portion 120 of casing 110 is also rotated clockwise, as illustrated in (b) of FIG. 20. Thus, while maintaining a state of engaging with engaged portion 201 of column post 200, engaging portion 123 moves from the one end portion to the other end portion (from the right side to the left side in FIG. 20) of the upper edge portion of the through hole stated above in the circumferential direction.

At this time, as illustrated in (b) of FIG. 19, projection 152a of rotation restriction member 150 is rotated together with tubular portion 120. As a result, while being in contact with sloping bottom surface 212 of first recess 210, projection 152a goes up sloping bottom surface 212 and moves to a position that faces non-sloping bottom surface 211. Thus, base 152 of rotation restriction member 150 is pushed upward in the positive Z-axis direction, and presses biasing member 140 in the positive Z-axis direction. Biasing member 140 elastically deforms due to pressure applied by base 152 of rotation restriction member 150, since movement of biasing member 140 in the positive Z-axis direction is restricted by brim portion 124 of tubular portion 120. As a result, biasing member 140 biases brim portion 124 in a direction in which brim portion 124 moves away from column post 200 in the central axis direction (that is, the Z-axis direction).

At the same time, rotation engaging portion 152b of rotation restriction member 150 moves while being in contact with the sloping lateral surface of second recess 220 and being bent upward in the Z-axis direction, and is put into first recess 210. As a result, projection 152a of rotation restriction member 150 comes into contact with one of the two lateral surfaces of first recess 210 (specifically, the left lateral surface in FIG. 19). Furthermore, rotation engaging portion 152b of rotation restriction member 150 comes into contact with a remaining one of the two lateral surfaces (specifically, the right lateral surface in FIG. 19). Accordingly, rotation of rotation restriction member 150 relative to column post 200 is restricted.

As described above, input device 100 according to the present embodiment includes casing 110, and biasing member 140. Casing 110 includes tubular portion 120 in which an end portion of column post 200 is fitted, and to which an operation portion that a driver operates is attached, column post 200 rotatably supporting steering shaft 300. Biasing member 140 is disposed between brim portion 124 and column post 200 in a central axis direction of tubular portion 120, brim portion 124 being provided on an inside surface of tubular portion 120. Tubular portion 120 includes engaging portion 123 that engages, in the central axis direction stated above, with engaged portion 201 of column post 200. In a state in which engaging portion 123 is engaging with engaged portion 201, biasing member 140 biases brim portion 124 in a direction in which brim portion 124 moves away from column post 200, the direction being in the central axis direction.

Accordingly, in a state in which engaging portion 123 of tubular portion 120 is engaging with engaged portion 201 of column post 200, biasing member 140 biases brim portion 124 of tubular portion 120 in a direction in which brim portion 124 moves away from column post 200. Thus, engaging portion 123 and engaged portion 201 are firmly engaged with each other in the central axis direction by the biasing force applied from biasing member 140, and the friction between tubular portion 120 and column post 200 can be increased. As a result, tubular portion 120 can be prevented from being shifted in the central axis direction thereof relative to column post 200, and also tubular portion 120 can be prevented from rotating in the circumferential direction relative to column post 200. Accordingly, input device 100 can be fixed to column post 200. Furthermore, it is unnecessary to use the clamping band member as in PTL 1 above to fix input device 100 to column post 200, and thus a space for attaching the clamping band member is not required. As a result, the size of input device 100 can be readily reduced. Furthermore, PTL 1 above requires a dedicated tool to loosen the clamping by the clamping band member when the input device is detached from the steering shaft. However, input device 100 according to the present embodiment does not need a clamping band member, and thus can be readily detached from steering shaft 300 without using such a dedicated tool. Furthermore, in PTL 1 above, the pin removed from the clamping band member is discarded, but nevertheless, input device 100 according to the present embodiment does not use such a pin, and thus resources can be prevented from being wastefully discarded. Note that in the present embodiment, input device 100 includes rotation restriction member 150, but may not include rotation restriction member 150.

Input device 100 according to the present embodiment includes: rotation restriction member 150. Rotation restriction member 150 is disposed between brim portion 124 and column post 200 in the central axis direction of tubular portion 120, and restricts rotation of tubular portion 120 in a circumferential direction relative to column post 200. Thus, rotation restriction member 150 restricts rotation of tubular portion 120 by engaging with brim portion 124 in the circumferential direction and engaging with column post 200 in the circumferential direction, in a state in which biasing member 140 is located between rotation restriction member 150 and brim portion 124.

Accordingly, rotation of tubular portion 120 in the circumferential direction relative to column post 200 can be restricted, and thus input device 100 can be firmly fixed to column post 200.

Rotation restriction member 150 includes: base 152; and projection 152a in contact with column post 200, projection 152a projecting from base 152, and rotation restriction member 150 presses and elastically deforms biasing member 140 by projection 152a being in contact with column post 200. Specifically, column post 200 includes first recess 210 in which projection 152a is put, first recess 210 being recessed in a central axis direction of column post 200. First recess 210 has a bottom surface, the bottom surface including non-sloping bottom surface 211 and sloping bottom surface 212. Non-sloping bottom surface 211 is substantially perpendicular to a central axis of column post 200. Sloping bottom surface 212 has a slope that increases a depth of first recess 210 with distance from non-sloping bottom surface 211. When input device 100 is attached to steering shaft 300, rotation restriction member 150 presses and elastically deforms biasing member 140 by projection 152a of rotation restriction member 150, which is put in first recess 210 and faces sloping bottom surface 212, sliding along sloping bottom surface 212 and moving onto non-sloping bottom surface 211 along with rotation of casing 110.

Accordingly, if casing 110 is rotated in a state in which an end portion of column post 200 is pushed in tubular portion 120 of casing 110 and engaging portion 123 of tubular portion 120 is engaging with engaged portion 201 of the column post, biasing member 140 can be elastically deformed with ease. As a result, input device 100 can be fixed to column post 200 readily and further firmly.

Base 152 of rotation restriction member 150 includes rotation engaging portion 152b that bends in the central axis direction of tubular portion 120, rotation engaging portion 152b projecting toward column post 200. Column post 200 further includes second recess 220 that is recessed in the central axis direction of column post 200, and in which rotation engaging portion 152b is put. When input device 100 is attached to steering shaft 300, rotation engaging portion 152b of rotation restriction member 150 that is put in second recess 220 is put into first recess 210 by moving while bending along with rotation of casing 110, and projection 152a put into first recess 210 engages with one of two lateral surfaces of first recess 210, and rotation engaging portion 152b put into first recess 210 engages with a remaining one of the two lateral surfaces of first recess 210.

Accordingly, if casing 110 is rotated in a state in which an end portion of column post 200 is pushed in tubular portion 120 of casing 110 and engaging portion 123 of tubular portion 120 is engaging with engaged portion 201 of column post 200, projection 152a and rotation engaging portion 152b can be readily fitted into first recess 210. As a result, one of projection 152a and rotation engaging portion 152b engages with a lateral surface of first recess 210 and the other engages with another lateral surface thereof, so that projection 152a and rotation engaging portion 152b engage with the lateral surfaces in both ways of the circumferential direction of tubular portion 120. Thus, rotation of tubular portion 120 in the circumferential direction relative to column post 200 can be appropriately restricted. Accordingly, input device 100 can be further firmly and readily fixed to column post 200.

Biasing member 140 is a ring-shaped plate member, and curves in the central axis direction of tubular portion 120. Accordingly, brim portion 124 of tubular portion 120 can be firmly biased while the thickness of biasing member 140 in the central axis direction of tubular portion 120 is reduced. As a result, input device 100 can be further firmly fixed to column post 200.

Rotation restriction member 150 is a ring-shaped member having one or more insertion holes 151, and protrusion 121 provided on brim portion 124 of tubular portion 120 is put into each of one or more insertion holes 151.

Accordingly, protrusion 121 of tubular portion 120 engages with the perimeter of insertion hole 151 of rotation restriction member 150, in the circumferential direction of tubular portion 120. Thus, rotation of tubular portion 120 relative to rotation restriction member 150 can be appropriately restricted.

A movable body according to an aspect of the present disclosure includes: input device 100 as described above; steering shaft 300; and column post 200. For example, the movable body is vehicle 4. Accordingly, the movable body can be provided with input device 100 having a reduced size, and as a result, can be provided with a further greater indoor space.

A steering shaft system according to an aspect of the present disclosure includes: steering shaft 300; and column post 200 that rotatably supports steering shaft 300. Column post 200 includes first recess 210 that is recessed in a central axis direction of column post 200, and in which projection 152a included in a member for attaching input device 100 to steering shaft 300 is put. First recess 210 has a bottom surface, the bottom surface including non-sloping bottom surface 211 and sloping bottom surface 212. Non-sloping bottom surface 211 is substantially perpendicular to a central axis of column post 200. Sloping bottom surface 212 has a slope that increases a depth of first recess 210 with distance from non-sloping bottom surface 211. Column post 200 further includes second recess 220 that is recessed in the central axis direction of column post 200, and in which rotation engaging portion 152b included in the member for attaching input device 100 to steering shaft 300 is put.

Accordingly, input device 100 having a reduced size can be attached to steering shaft 300. Furthermore, input device 100 can be firmly fixed to column post 200.

Embodiment 2

Figure 21:
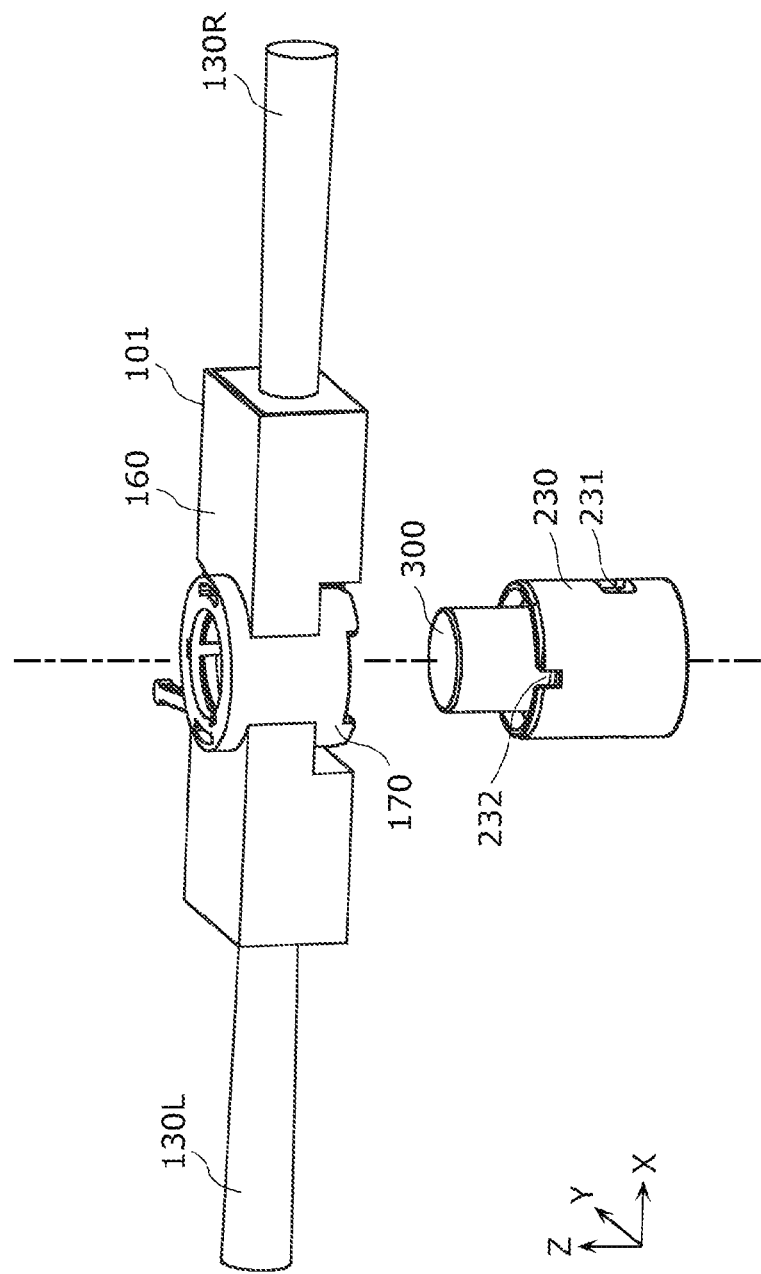
FIG. 21 is a perspective view schematically illustrating an appearance of an input device in Embodiment 2.

FIG. 21 is a perspective view schematically illustrating an appearance of input device 101 according to Embodiment 2. The structure of input device 101 according to the present embodiment is the same as that in Embodiment 1, unless otherwise specifically stated. The same sign is given to the same structural element, and a detailed description of the structural element is omitted.

Figure 22:
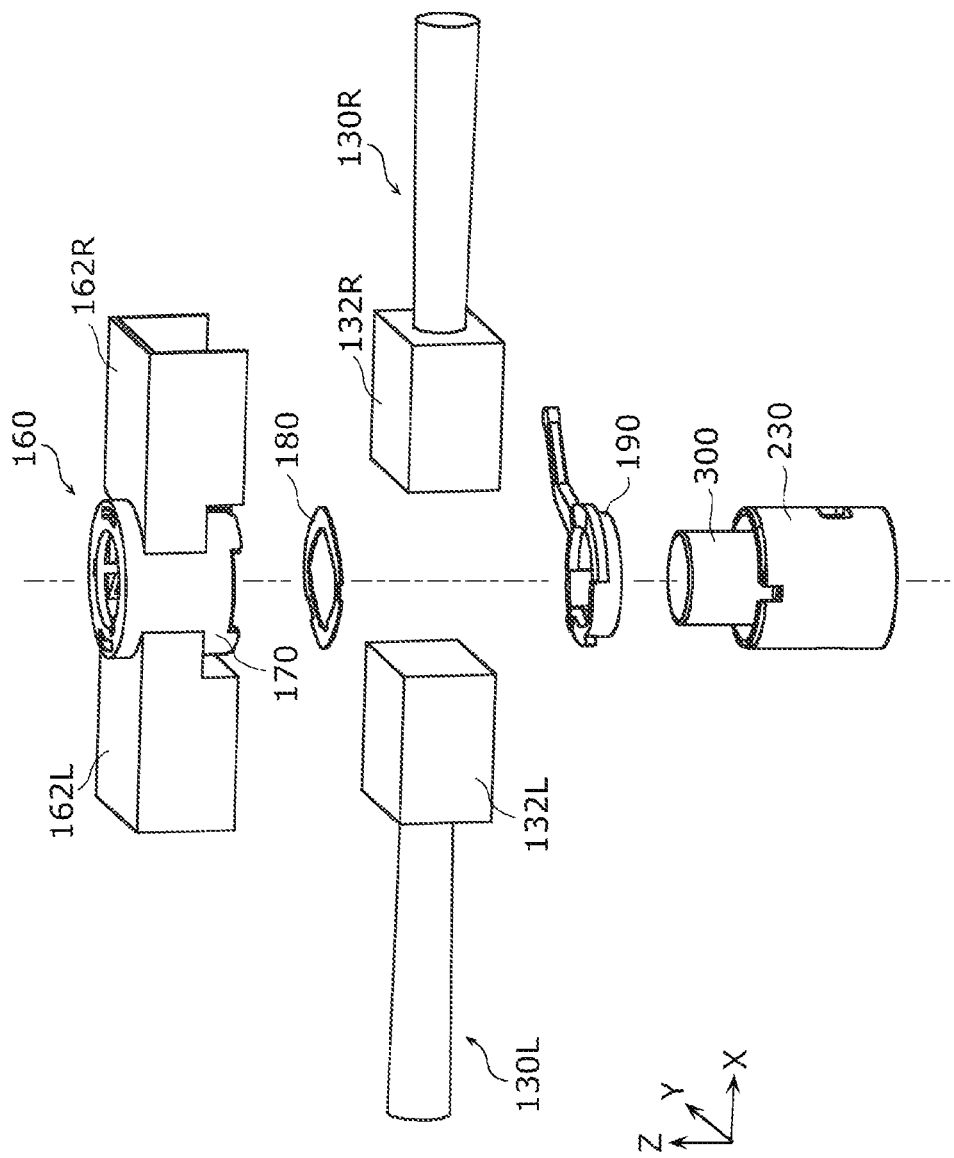
FIG. 22 is an exploded perspective view of the disassembled input device from above in Embodiment 2.
Figure 23:
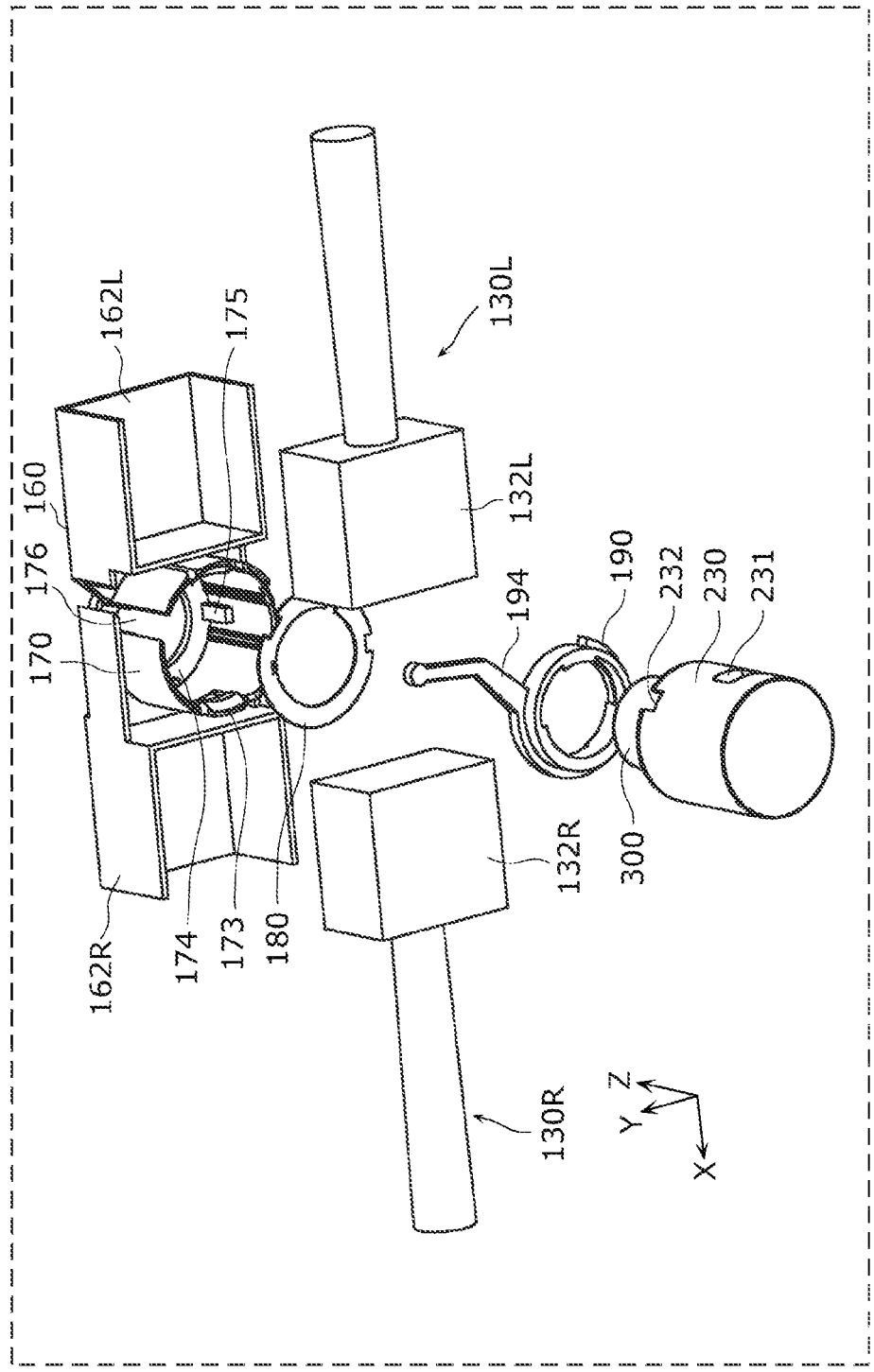
FIG. 23 is an exploded perspective view of the disassembled input device from below in Embodiment 2.

FIG. 22 is an exploded perspective view of disassembled input device 101 from above in the present embodiment, and FIG. 23 is an exploded perspective view of disassembled input device 101 from below in the present embodiment.

Input device 101 includes biasing member 180 and rotation pressing member 190, in addition to casing 160, turn lever unit 130R, and wiper lever unit 130L, as illustrated in FIG. 22 and FIG. 23.

Lever holder 132R of turn lever unit 130R is attached to first holder attachment portion 162R of casing 160, and lever holder 132L of wiper lever unit 130L is attached to second holder attachment portion 162L, which is the same as in Embodiment 1.

Biasing member 180 is a metal plate member formed into a ring shape, for example, and put into tubular portion 170 of casing 160 from the negative side of the Z-axis direction. Brim portion 174 is formed on an upper end portion of the inside surface of tubular portion 170, and biasing member 180 is disposed in contact with brim portion 174, which is the same as in Embodiment 1.

Rotation pressing member 190 is a resin-molded member formed into a ring shape, for example, and put into tubular portion 170 of casing 160 from the negative side of the Z-axis direction. Rotation pressing member 190 is disposed in tubular portion 170 such that biasing member 180 is located between rotation pressing member 190 and brim portion 174 of tubular portion 170 stated above.

When such input device 101 is attached to steering shaft 300, steering shaft 300 passes through rotation pressing member 190, biasing member 180, and tubular portion 170. The upper end portion of column post 230 is fitted in tubular portion 170.

At this time, the upper end portion of column post 230 is in contact with rotation pressing member 190 disposed in tubular portion 170. Thus, biasing member 180 and rotation pressing member 190 are located between the upper end portion of column post 230 and brim portion 174 formed on the upper end portion of the inside surface of tubular portion 170, in the Z-axis direction.

Figure 24:
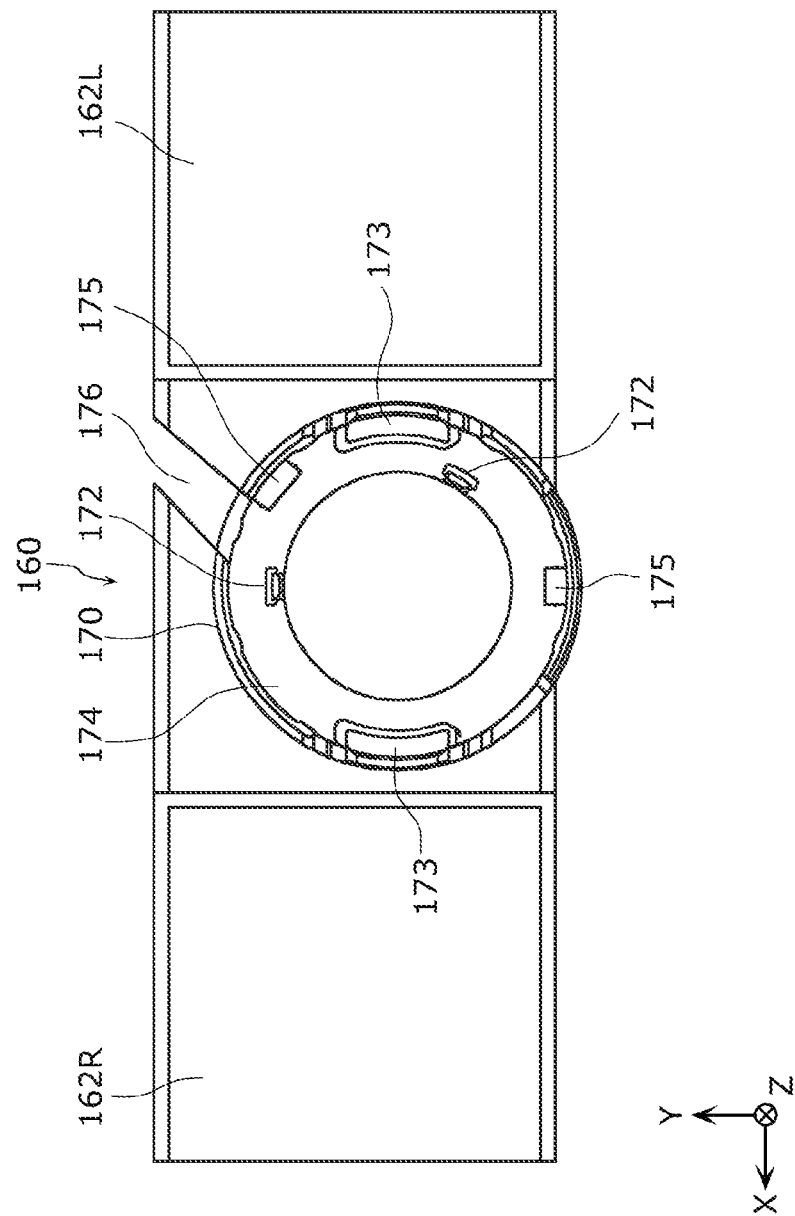
FIG. 24 is a bottom view of a state of a casing of the input device from the negative side of the Z-axis direction in Embodiment 2.

FIG. 24 is a bottom view of a state of casing 160 from the negative side of the Z-axis direction in the present embodiment. In FIG. 24, above-described ring-shaped brim portion 174 that projects toward the central axis of tubular portion 170 is formed on the inside surface of tubular portion 170 of casing 160.

Two restricted portions 175 and two claws 172 are formed on the surface of brim portion 174 on the negative side of the Z-axis direction. Two restricted portions 175 project from the inside surface of tubular portion 170 toward the central axis and also extend in the negative Z-axis direction.

Two restricted portions 175 are engaged with two restricting portions 232 formed in column post 230 described later, to restrict rotation of casing 160 about the central axis relative to column post 230.

Two claws 172 project in the negative Z-axis direction. Furthermore, the tip end portions of claws 172 project in a direction away from the central axis of tubular portion 170 along the XY plane. Claws 172 are used to prevent biasing member 180 and rotation pressing member 190, which are described above, from falling in the negative Z-axis direction.

Tubular portion 170 includes two engaging portions 173. Engaging portions 173 engage with engaged portions 231 formed in column post 230.

Furthermore, as illustrated in FIG. 23 and FIG. 24, slit 176 extending from the lower end of tubular portion 170 on the negative side of the Z-axis direction upward on the positive side thereof is formed in the lateral portion of tubular portion 170 and the lateral portion of casing 160 in the central axis direction. When rotation pressing member 190 is put into tubular portion 170 from the lower opening of tubular portion 170, rotation operation portion 194 is guided to slit 176 and disposed in an upper location.

Figure 25:
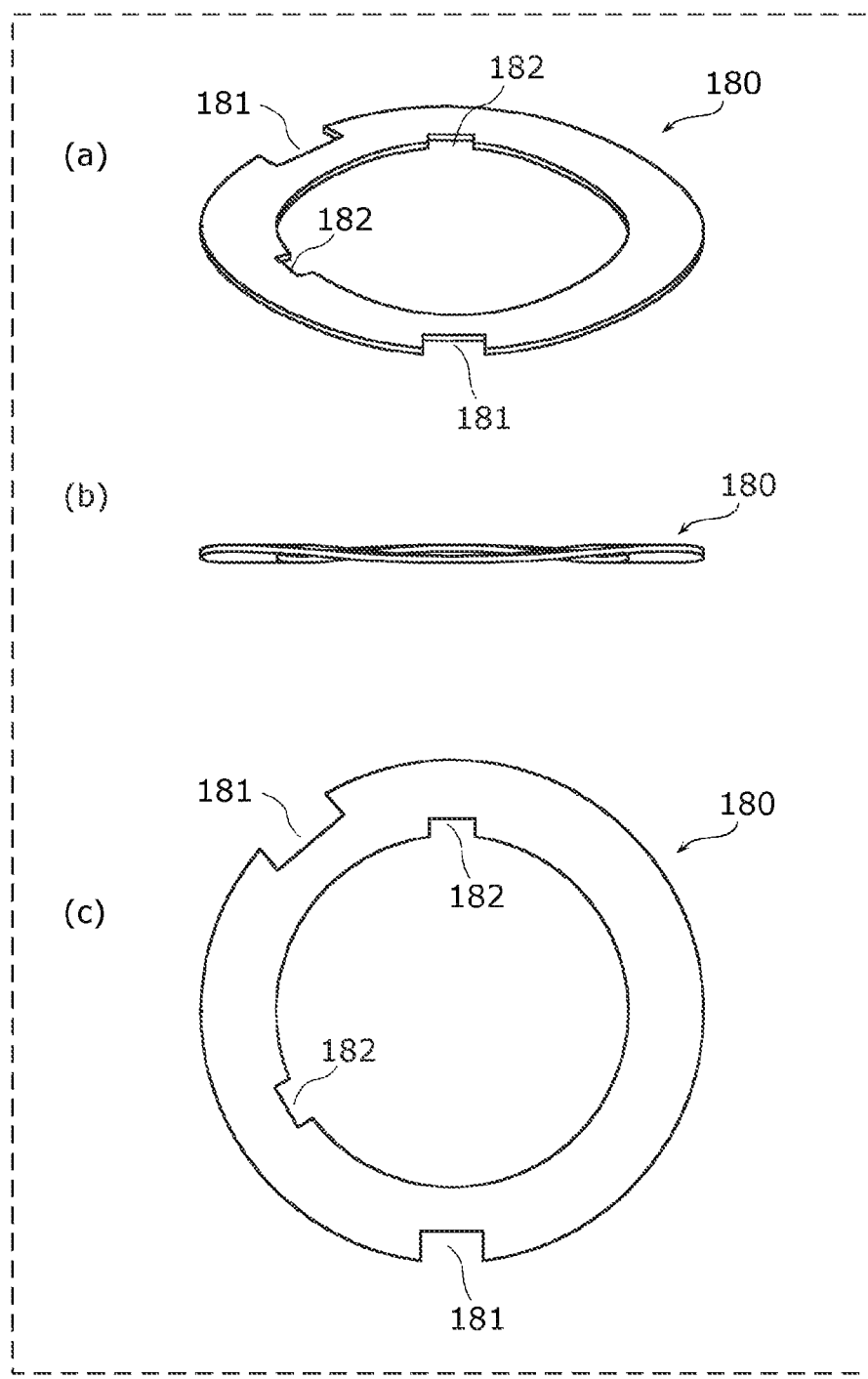
FIG. 25 illustrates appearances of a biasing member of the input device in Embodiment 2.

FIG. 25 illustrates appearances of biasing member 180 in the present embodiment. Specifically, (a) of FIG. 25 is a perspective view of biasing member 180, (b) of FIG. 25 illustrates a state of biasing member 180 viewed in a direction along the XY plane, and (c) of FIG. 25 is a top view of biasing member 180.

As illustrated in (a) and (c) of FIG. 25, two first notches 181 are formed in the outer circumferential portion of biasing member 180 having a ring-shaped appearance. Two restricted portions 175 of casing 160 illustrated in FIG. 24 are put into first notches 181. Two claws 172 of casing 160 are put into second notches 182 formed in the inner circumferential portion of biasing member 180.

Furthermore, biasing member 180 in the present embodiment is a so-called waved washer, and is formed into a wavy shape that curves in the Z-axis direction as illustrated in (b) of FIG. 25, which is the same as in Embodiment 1.

Figure 26:
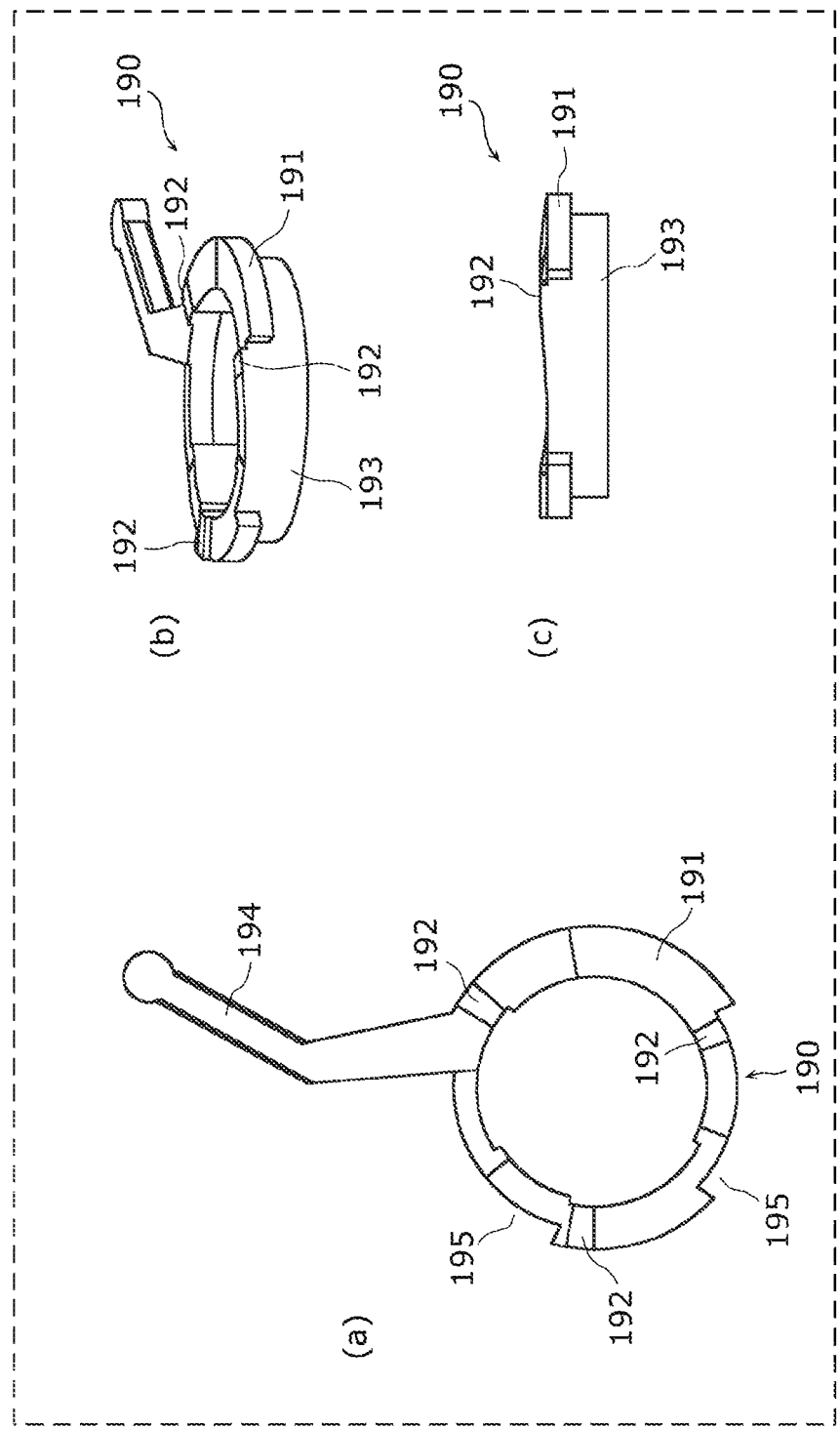
FIG. 26 illustrates appearances of a rotation pressing member of the input device in Embodiment 2.

FIG. 26 illustrates appearances of rotation pressing member 190 in the present embodiment. Specifically, (a) of FIG. 26 is a top view of rotation pressing member 190 from the positive side of the Z-axis direction, (b) of FIG. 26 is a perspective view, and (c) of FIG. 26 illustrates a state thereof viewed in a direction along the XY plane.

Rotation pressing member 190 includes base 191, rotation operation portion 194, and fitted portion 193. Fitted portion 193 is formed into a ring shape, and is fitted in the upper end opening of tubular column post 230.

Base 191 is substantially ring-shaped, projecting outward from the upper end of fitted portion 193 along the XY plane. Thus, base 191 faces the upper end of column post 230 in the Z-axis direction in a state in which fitted portion 193 is fitted in the upper end opening of column post 230.

Three pressing portions 192 projecting in the positive Z-axis direction are formed on the top surface of base 191 at substantially equal intervals. Pressing portions 192 have a mountain shape that slopes gradually up from the negative side (the left side) to the positive side (the right side) of the X-axis direction, for example, as illustrated in (c) of FIG. 26. Note that it is sufficient if at least one pressing portion 192 is provided.

Rotation pressing member 190 further includes rotation operation portion 194 formed into a lever shape that extends outward from the outer circumference of base 191. In a state in which rotation pressing member 190 is fitted in column post 230, rotation operation portion 194 is operated with a hand clockwise or counterclockwise, so that pressing portions 192 are also rotated clockwise or counterclockwise.

Note that other than the lever shape, rotation operation portion 194 may have a substantially hook shape or a substantially trapezoid shape. Rotation operation portion 194 may be rotated using a predetermined tool. Recesses and projections may be formed in the outer circumferential surface of base 191, and rotation pressing member 190 may be rotated using a predetermined tool. Rotation operation portion 194 may have a shape that allows rotation pressing member 190 to rotate within a predetermined range.

Furthermore, two notches 195 each obtained by a predetermined area being excluded from base 191 along the outer circumference thereof. Two notches 195 allow rotation pressing member 190 to rotate within the predetermined area relative to restricted portions 175 formed in brim portion 174.

Figure 27:
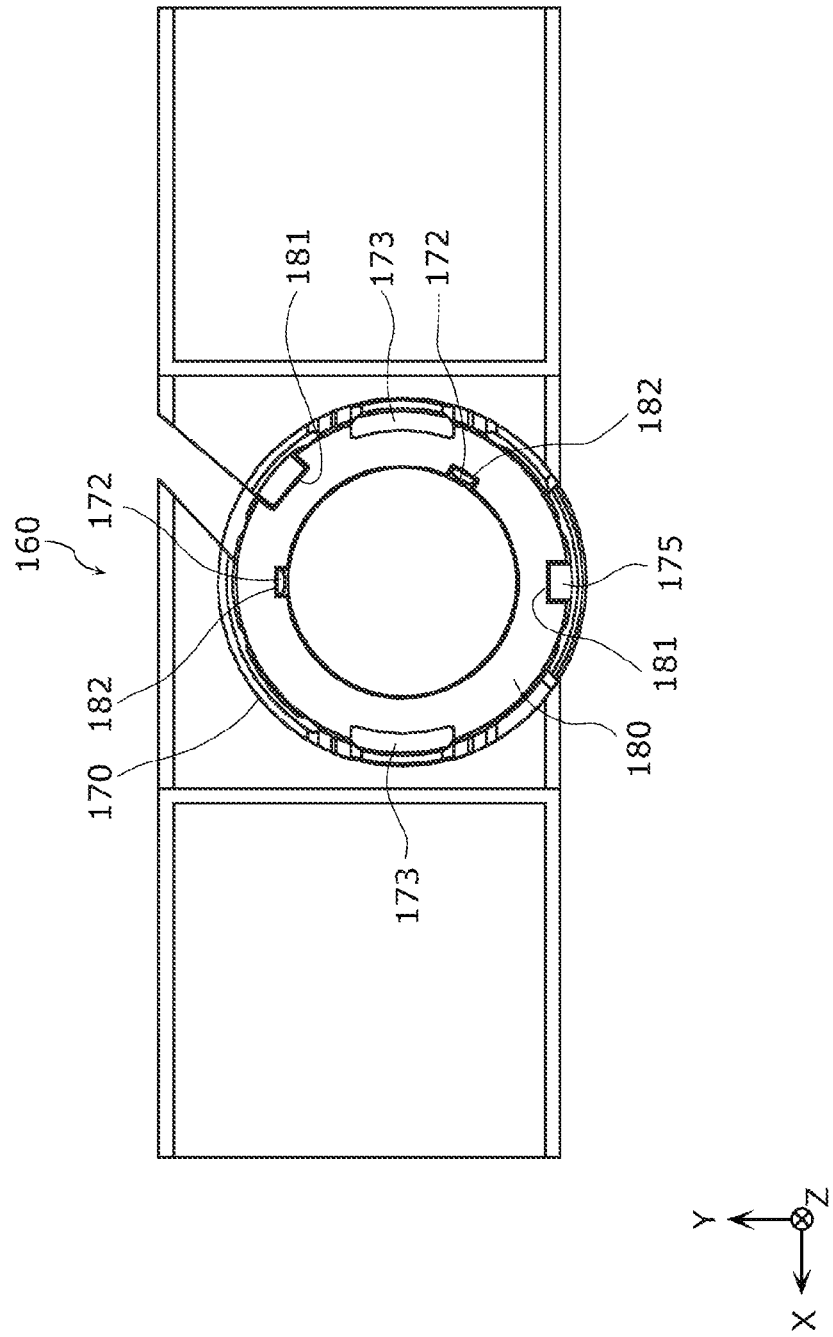
FIG. 27 is a bottom view of a casing to which the biasing member of the input device is attached in Embodiment 2.

FIG. 27 is a bottom view of casing 160 to which biasing member 180 is attached in the present embodiment.

Biasing member 180 is placed on a surface of brim portion 174 of tubular portion 170 on the negative side of the Z-axis direction, as illustrated in FIG. 27. At this time, two restricted portions 175 formed on brim portion 174 are put in and engaged with first notches 181 of biasing member 180. Accordingly, a shift of biasing member 180 along the XY plane relative to brim portion 174 is reduced.

Figure 28:
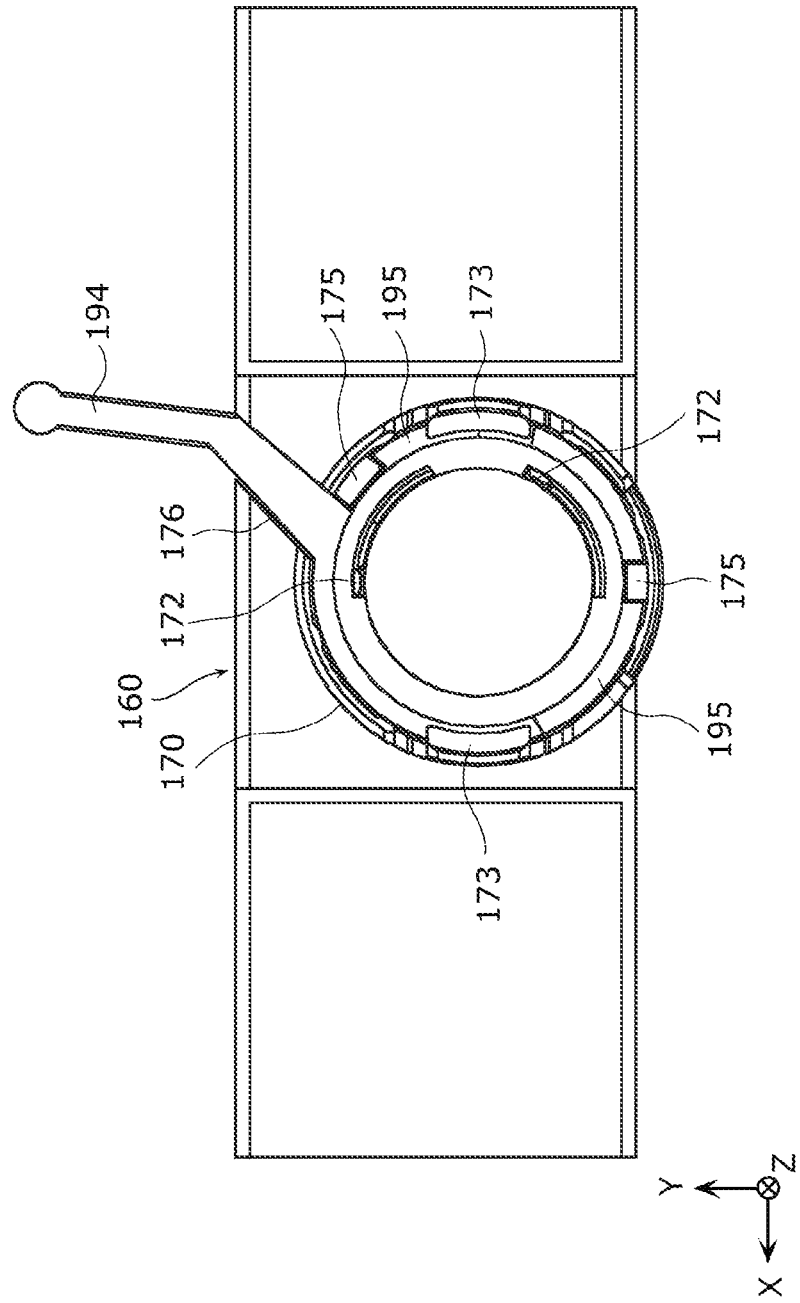
FIG. 28 is a bottom view of the casing to which the biasing member and the rotation pressing member of the input device are attached in Embodiment 2.

FIG. 28 is a bottom view of casing 160 to which biasing member 180 and rotation pressing member 190 are attached in the present embodiment.

Rotation pressing member 190 is disposed under and overlap biasing member 180 placed in tubular portion 170, as illustrated in FIG. 28. Thus, rotation pressing member 190 is disposed in tubular portion 170 such that biasing member 180 is located between rotation pressing member 190 and the surface of brim portion 174 of tubular portion 170 on the negative side of the Z-axis direction.

Rotation pressing member 190 disposed in such a manner is supported by two claws 172 of tubular portion 170 so as to be prevented from falling in the negative Z-axis direction.

Notches 195 are formed in the predetermined areas of rotation pressing member 190 in the circumferential direction. Restricted portion 175 of brim portion 174 is disposed at an end of each notch 195, and rotation pressing member 190 can be rotated within a range in which restricted portion 175 is moved and comes into contact with the other end of notch 195.

Figure 29:
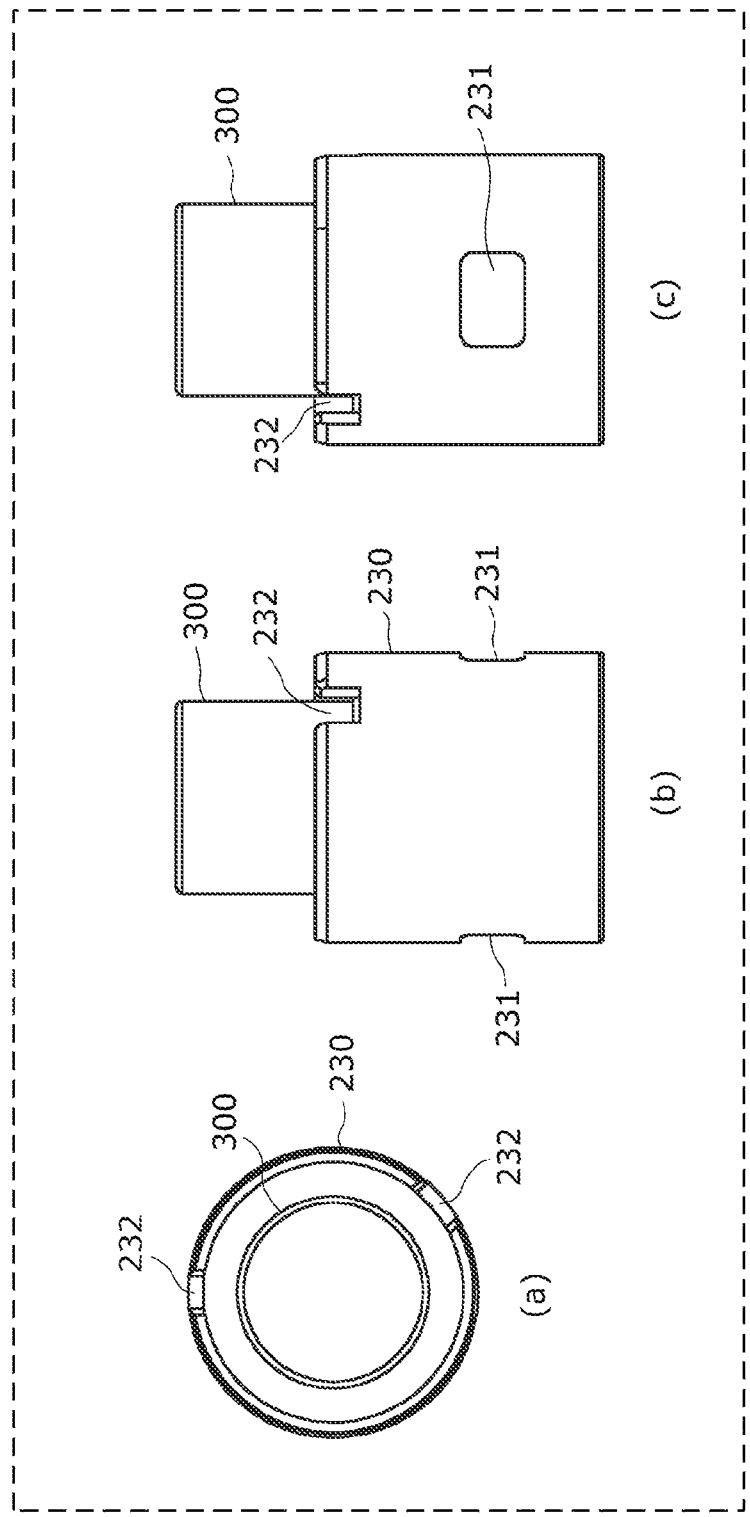
FIG. 29 illustrates a steering shaft and a column post for the input device in Embodiment 2.

FIG. 29 illustrates steering shaft 300 and column post 230 in the present embodiment. Note that (a) of FIG. 29 is a top view of steering shaft 300 and column post 230 from the positive side of the Z-axis direction, (b) of FIG. 29 illustrates steering shaft 300 and column post 230 viewed in a direction along the XY plane, and (c) of FIG. 29 illustrates steering shaft 300 and column post 230 viewed in another direction along the XY plane.

Two restricting portions 232 that are recessed in the negative Z-axis direction are formed in the upper end of column post 230 at a predetermined interval. When input device 101 is attached to steering shaft 300, restricted portions 175 of brim portion 174 are engaged with restricting portions 232. Accordingly, casing 160 can be prevented from rotating relative to column post 230.

Note that restricted portions 175 of brim portion 174 have a shape that projects in the negative Z-axis direction and restricting portions 232 of column post 230 have a shape that is recessed in the negative Z-axis direction, and restricted portions 175 and restricting portions 232 are engaged with one another, yet restricted portions 175 of brim portion 174 may have a shape recessed in the positive Z-axis direction, restricting portions 232 of column post 230 may have a shape that projects in the positive Z-axis direction, and restricted portions 175 and restricting portions 232 may be engaged with one another.

Two engaged portions 231 are formed in lateral portions of column post 230. Two engaged portions 231 are formed of perimeter portions of through holes having a substantially rectangular shape, and are provided on the opposite sides on the XY plane. Engaging portions 173 of tubular portion 170 engage with engaged portions 231 in the Z-axis direction. Specifically, when the upper end portion of column post 230 is fitted in tubular portion 170, engaging portions 173 of tubular portion 170 engage with engaged portions 231 of column post 230. Accordingly, a shift of tubular portion 170 in the Z-axis direction, or more specifically, a shift of tubular portion 170 in the positive Z-axis direction from column post 230 is reduced.

Here, the order in which input device 101 is attached to steering shaft 300 and column post 230, and is fixed to column post 230 is to be described with reference to FIG. 21, FIG. 30, and FIG. 31.

Figure 30:
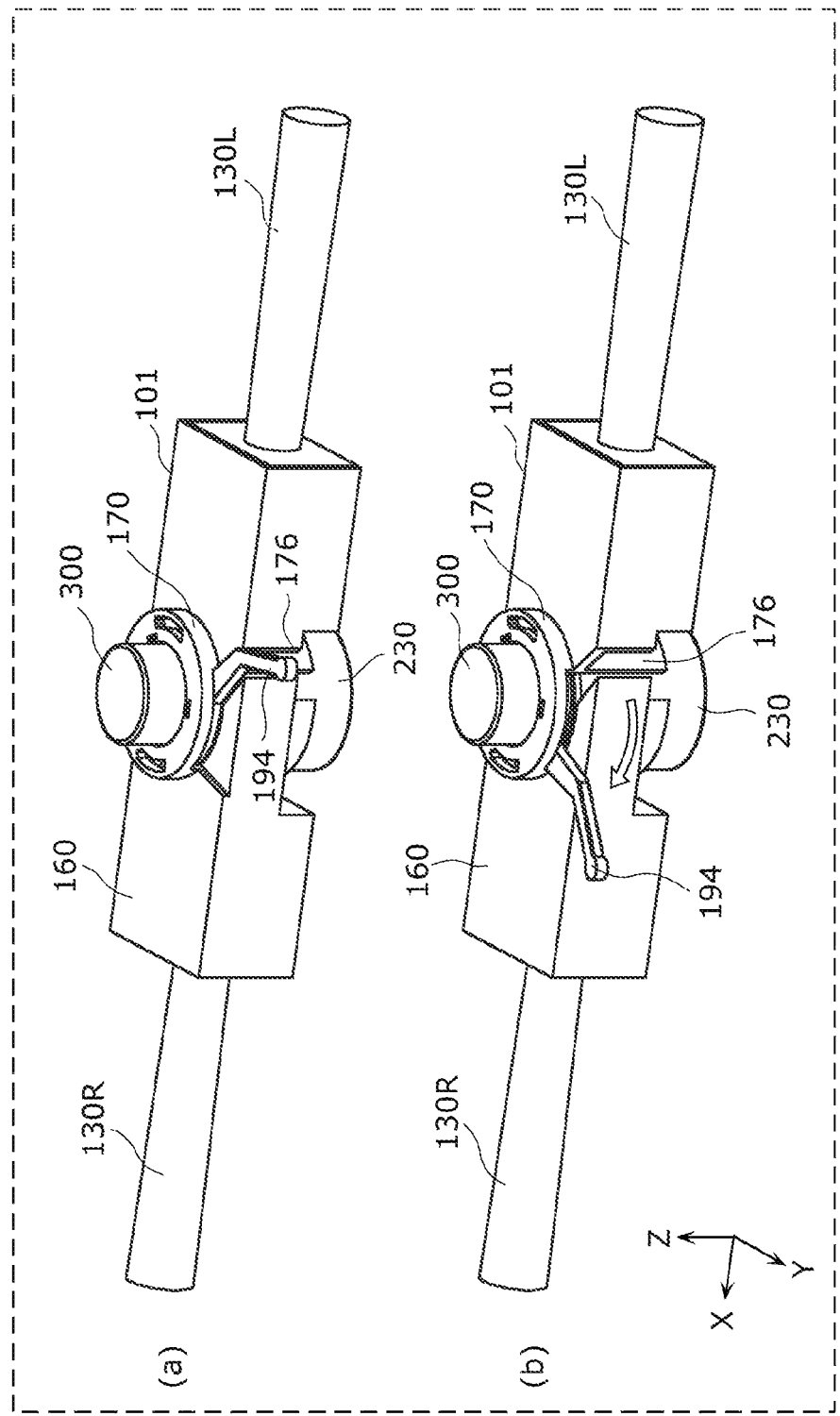
FIG. 30 illustrates the order in which the input device is attached to the steering shaft and the column post in Embodiment 2.

FIG. 30 is a perspective view of a state in which input device 101 is attached to steering shaft 300, from the positive side of the Y-axis direction and also from the positive side of the Z-axis direction in the present embodiment. Specifically, (a) of FIG. 30 illustrates a state before rotation pressing member 190 is rotated, and (b) of FIG. 30 illustrates a state after rotation pressing member 190 is rotated.

Figure 31:
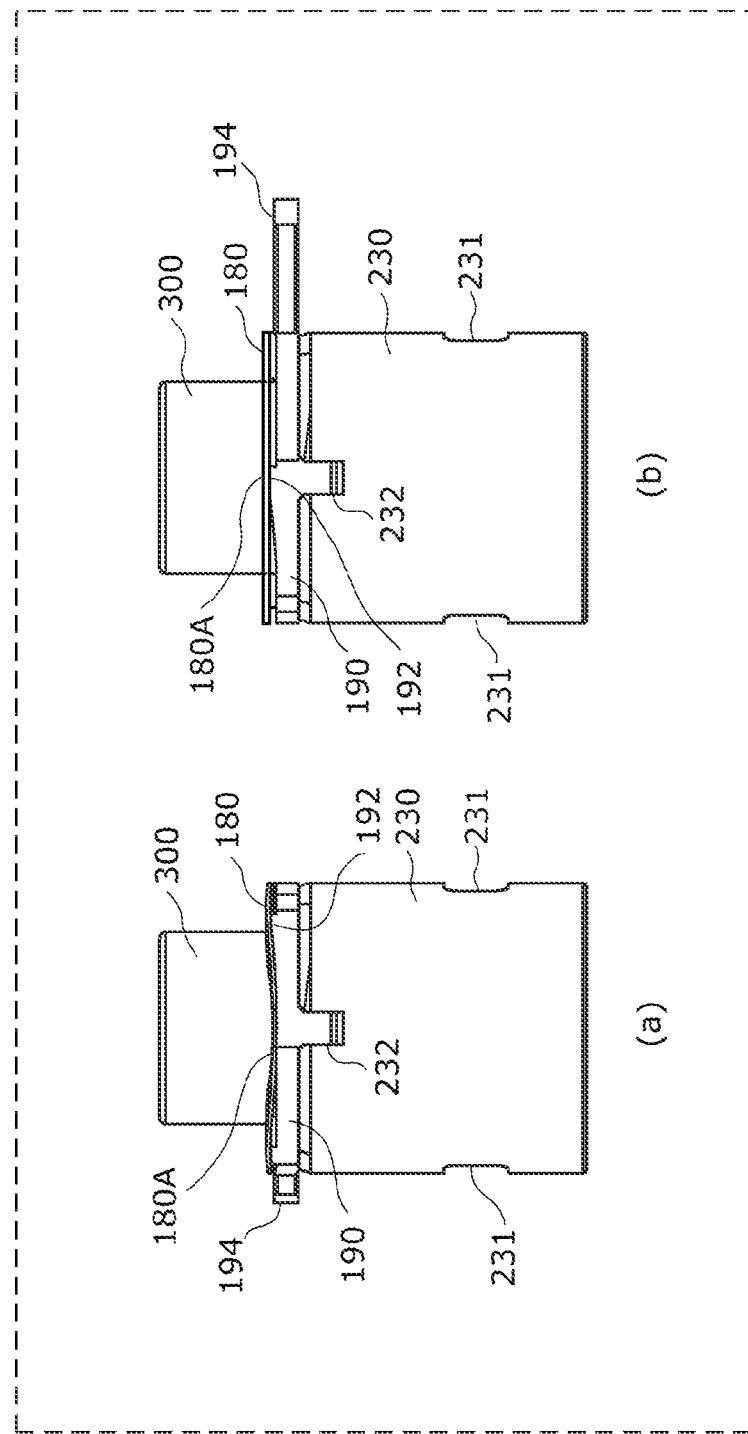
FIG. 31 illustrates rotational operation of the rotation pressing member of the input device in Embodiment 2.

FIG. 31 illustrates disposition of biasing member 180, rotation pressing member 190, and column post 230 in a state in which input device 101 is attached to steering shaft 300 in the present embodiment. Specifically, (a) of FIG. 31 is a lateral view, from the positive side of the Y-axis direction along the XY plane, of a state before rotation pressing member 190 is rotated, while casing 160 is excluded. Similarly, (b) of FIG. 31 illustrates a state after rotation pressing member 190 is rotated, similarly.

As illustrated in FIG. 21, the central axis of tubular portion 170 of input device 101 and the central axes of steering shaft 300 and column post 230 are aligned, the upper end portion of steering shaft 300 passes through tubular portion 170, and the upper end portion of column post 230 is fitted into tubular portion 170.

At this time, biasing member 180 and rotation pressing member 190 are disposed between brim portion 174 and the upper end portion of column post 230 in tubular portion 170 of input device 101, and are supported in tubular portion 170, being engaged with claws 172 formed on brim portion 174.

As illustrated in (a) of FIG. 30, when the upper end portion of column post 230 is fitted in tubular portion 170, two engaging portions 173 of tubular portion 170 moves downward along the lateral surface of column post 230 while being elastically in contact therewith, and engage with two engaged portions 231 with elastic force applied to the inner side of column post 230. Engaging portions 173 engage with engaged portions 231 by a so-called snap-fit, and movement of casing 160 in the positive Z-axis direction relative to column post 230 is restricted.

Furthermore, at this time, restricted portions 175 of tubular portion 170 engage with restricting portions 232 of column post 230, to restrict rotation of input device 101 relative to column post 230.

As illustrated in (a) of FIG. 30, in a state before rotation pressing member 190 is rotated, biasing member 180 and rotation pressing member 190 are placed on the upper end of column post 230 in a state in which steering shaft 300 passes therethrough as illustrated in (a) of FIG. 31.

At this time, pressing portion 192 of rotation pressing member 190 is positioned at an end on the positive side (right side) of the X-axis direction, and is away from the position of downward bulge 180A of biasing member 180.

Thus, pressing portion 192 of rotation pressing member 190 is disposed in a position away from bulge 180A of biasing member 180, as illustrated in (a) of FIG. 31. Accordingly, pressing portion 192 pushes biasing member 180 up with relatively small force.

If rotation operation portion 194 of rotation pressing member 190 is operated as illustrated in (b) of FIG. 30 to rotate clockwise from the state in (a) of FIG. 30, pressing portion 192 is rotated along with this to the negative side (left side) of the X-axis direction as illustrated in (b) of FIG. 31, and pushes up downward bulge 180A of biasing member 180 to press biasing member 180 in the positive Z-axis direction. As a result, biasing member 180 biases brim portion 174 in a direction in which brim portion 174 moves away from column post 230 in the central axis direction (that is, the Z-axis direction).

Thus, friction between the brim portion and the upper end of column post 230 produced by biasing member 180 is further increased, and input device 101 is more tightly fixed to column post 230.

When input device 101 is to be exchanged from the state illustrated in (b) of FIG. 30 in which input device 101 is firmly fixed to column post 230, rotation operation portion 194 is rotated counterclockwise to be brought into the state illustrated in (a) of FIG. 30, so that fixation between input device 101 and column post 230 is loosened, which allows input device 101 to be detached with easy work.

As described above, input device 101 according to the present embodiment includes casing 160, and biasing member 180. Input device 101 includes casing 160 and biasing member 180. Casing 160 includes tubular portion 170 in which an end portion of column post 230 is fitted, and to which an operation portion that a driver operates is attached, column post 230 rotatably supporting steering shaft 300. Biasing member 180 is disposed between brim portion 174 and column post 230 in a central axis direction of tubular portion 170, brim portion 174 being provided on an inside surface of tubular portion 170. Tubular portion 170 includes engaging portion 173 that engages, in the central axis direction described above, with engaged portion 231 of column post 230. In a state in which engaging portion 173 is engaging with engaged portion 231, biasing member 180 biases brim portion 174 in a direction in which brim portion 174 moves away from column post 230, the direction being in the central axis direction.

Advantageous effects yielded thereby are similar to Embodiment 1, and description thereof is omitted.

Input device 101 according to the present embodiment includes rotation pressing member 190. Rotation pressing member 190 is disposed between brim portion 174 and column post 230 in the central axis direction of tubular portion 170. Rotation pressing member 190 presses and elastically deforms biasing member 180 by rotating in a state in which biasing member 180 is located between rotation pressing member 190 and brim portion 174.

Accordingly, friction between tubular portion 170 and column post 230 can be increased by rotating rotation pressing member 190, and thus input device 101 can be fixed to column post 230 with easy work.

Rotation pressing member 190 includes: base 191; and at least one pressing portion 192 that projects from base 191 and comes into contact with biasing member 180. Rotation pressing member 190 presses and elastically deforms biasing member 180 by at least one pressing portion 192 coming into contact with biasing member 180 along with rotation of rotation pressing member 190.

Accordingly, for example, rotation pressing member 190 can be readily formed by forming pressing portion 192 of rotation pressing member 190 into a mountain shape that includes a sloping portion that projects toward biasing member 180, and thus pressing portion 192 can be certainly pressed against biasing member 180.

When input device 101 is attached to steering shaft 300, at least one pressing portion 192 comes into contact with, presses, and elastically deforms biasing member 180 by rotation pressing member 190 rotating.

Accordingly, friction between tubular portion 170 and column post 230 can be increased by rotating rotation pressing member 190, and thus input device 101 can be fixed to column post 230 with easy work.

Brim portion 174 of tubular portion 170 includes restricted portion 175 that projects or is recessed in the central axis direction, column post 230 includes restricting portion 232 that is recessed or projects in a central axis direction of column post 230, and rotation of tubular portion 170 in a circumferential direction relative to column post 230 is restricted in a state in which restricted portion 175 is engaged with restricting portion 232.

Accordingly, rotation of tubular portion 170 in the circumferential direction relative to column post 230 can be restricted, and thus input device 101 can be further firmly fixed to column post 230.

Biasing member 180 is a ring-shaped plate member, and curves in the central axis direction of tubular portion 170.

Accordingly, brim portion 174 of tubular portion 170 can be greatly biased while the thickness of biasing member 180 in the central axis direction of tubular portion 170 is reduced. As a result, input device 101 can be further firmly fixed to column post 230.

Rotation pressing member 190 includes rotation operation portion 194 on an outer circumference.

Accordingly, for example, rotation pressing member 190 can be rotated by operating rotation operation portion 194 formed into a lever shape, and thus input device 101 can be readily fixed or detached from column post 230.

The above has given a description of the input devices and others according to one or more aspects, based on the embodiments, yet the present disclosure is not limited to such embodiments. The scope of the present disclosure may also encompass various modifications that may be conceived by those skilled in the art to the embodiments of this application, and embodiments achieved by combining other elements, without departing from the purport of the present disclosure.

For example, biasing members 140 and 180 may each be a spring such as a coiled spring or a plate spring, or a washer such as a spring washer.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2019-231882 filed on Dec. 23, 2019, Japanese Patent Application No. 2020-061550 filed on Mar. 30, 2020, and PCT International Application No. PCT/JP2020/043390 filed on Nov. 20, 2020.

INDUSTRIAL APPLICABILITY

The present disclosure is applicable to an input device that is attached to a steering shaft of a vehicle, for example.

The invention claimed is:
1. An input device comprising:
a casing that includes a tubular portion in which an end portion of a column post is fitted, and to which an operation portion that a driver operates is attached, the column post rotatably supporting a steering shaft;
a biasing member disposed between a brim portion and the column post in a central axis direction of the tubular portion, the brim portion being provided on an inside surface of the tubular portion; and a rotation restriction member that is disposed between the brim portion and the column post in the central axis direction of the tubular portion, and restricts rotation of the tubular portion in a circumferential direction relative to the column post, wherein:
- the tubular portion includes an engaging portion that engages, in the central axis direction, with an engaged portion of the column post,
- in a state in which the engaging portion is engaging with the engaged portion, the biasing member biases the brim portion in a direction in which the brim portion moves away from the column post, the direction being in the central axis direction,
- the rotation restriction member restricts rotation of the tubular portion by engaging with the brim portion in the circumferential direction and engaging with the column post in the circumferential direction, in a state in which the biasing member is located between the rotation restriction member and the brim portion,
- the rotation restriction member includes:
  - a base; and
  - a projection in contact with the column post, the projection projecting from the base,
- the rotation restriction member presses and elastically deforms the biasing member by the projection being in contact with the column post,
- the column post includes a first recess in which the projection is put, the first recess being recessed in a central axis direction of the column post,
- the first recess has a bottom surface, the bottom surface including a non-sloping bottom surface and a sloping bottom surface,
- the non-sloping bottom surface is substantially perpendicular to a central axis of the column post,
- the sloping bottom surface has a slope that increases a depth of the first recess with distance from the non-sloping bottom surface, and
- when the input device is attached to the steering shaft, the rotation restriction member presses and elastically deforms the biasing member by the projection of the rotation restriction member, which is put in the first recess and faces the sloping bottom surface, sliding along the sloping bottom surface and moving onto the non-sloping bottom surface along with rotation of the casing.

2. The input device according to claim 1,
wherein the base of the rotation restriction member includes a rotation engaging portion that bends in the central axis direction of the tubular portion, the rotation engaging portion projecting toward the column post,
the column post further includes a second recess that is recessed in the central axis direction of the column post, and in which the rotation engaging portion is put, and
when the input device is attached to the steering shaft,
- the rotation engaging portion of the rotation restriction member that is put in the second recess is put into the first recess by moving while bending along with rotation of the casing, and
- the projection put into the first recess engages with one of two lateral surfaces of the first recess, and the rotation engaging portion put into the first recess engages with a remaining one of the two lateral surfaces of the first recess.

3. The input device according to claim 1,
wherein the biasing member is a ring-shaped plate member, and curves in the central axis direction of the tubular portion.

4. The input device according to claim 1,
wherein the rotation restriction member is a ring-shaped member having one or more insertion holes, and
a protrusion provided on the brim portion of the tubular portion is put into each of the one or more insertion holes.

5. A movable body comprising:
the input device according to claim 1;
the steering shaft; and
the column post.

6. An input device comprising:
a casing that includes a tubular portion in which an end portion of a column post is fitted, and to which an operation portion that a driver operates is attached, the column post rotatably supporting a steering shaft;
a biasing member disposed between a brim portion and the column post in a central axis direction of the tubular portion, the brim portion being provided on an inside surface of the tubular portion; and
a rotation pressing member disposed between the brim portion and the column post in the central axis direction of the tubular portion, wherein:
- the tubular portion includes an engaging portion that engages, in the central axis direction, with an engaged portion of the column post,
- in a state in which the engaging portion is engaging with the engaged portion, the biasing member biases the brim portion in a direction in which the brim portion moves away from the column post, the direction being in the central axis direction, and
- the rotation pressing member presses and elastically deforms the biasing member by rotating in a state in which the biasing member is located between the rotation pressing member and the brim portion.

7. The input device according to claim 6,
wherein the rotation pressing member includes:
a base; and
at least one pressing portion that projects from the base and comes into contact with the biasing member, and
the rotation pressing member presses and elastically deforms the biasing member by the at least one pressing portion coming into contact with the biasing member along with rotation of the rotation pressing member.

8. The input device according to claim 7,
wherein when the input device is attached to the steering shaft, the at least one pressing portion comes into contact with, presses, and elastically deforms the biasing member by the rotation pressing member rotating.

9. The input device according to claim 6,
wherein the brim portion of the tubular portion includes a restricted portion that projects or is recessed in the central axis direction,
the column post includes a restricting portion that is recessed or projects in a central axis direction of the column post, and
rotation of the tubular portion in a circumferential direction relative to the column post is restricted in a state in which the restricted portion is engaged with the restricting portion.

10. The input device according to claim 6,
wherein the biasing member is a ring-shaped plate member, and curves in the central axis direction of the tubular portion.

11. The input device according to claim 6,
wherein the rotation pressing member includes a rotation operation portion on an outer circumference.

12. A movable body comprising:
the input device according to claim 6;
the steering shaft; and
the column post.

13. An input device comprising:
a casing that includes a tubular portion in which an end portion of a column post is fitted, and to which an operation portion that a driver operates is attached, the column post rotatably supporting a steering shaft; and
a biasing member disposed between a brim portion and the column post in a central axis direction of the tubular portion, the brim portion being provided on an inside surface of the tubular portion,
wherein:
  the tubular portion includes an engaging portion that engages, in the central axis direction, with an engaged portion of the column post,
  in a state in which the engaging portion is engaging with the engaged portion, the biasing member biases the brim portion in a direction in which the brim portion moves away from the column post, the direction being in the central axis direction, and
  the biasing member is a ring-shaped plate member, and curves in the central axis direction of the tubular portion.

* * * * *